(12) United States Patent
Haney et al.

(10) Patent No.: US 11,674,880 B2
(45) Date of Patent: Jun. 13, 2023

(54) METHODS OF DETERMINING RADIUS OF GYRATION OF A PARTICLE USING LIGHT SCATTERING DETECTORS

(71) Applicant: M & J Scientific, LLC, Cleveland, TX (US)

(72) Inventors: Max Haney, Cleveland, TX (US); Michael P. Murphy, Cleveland, TX (US)

(73) Assignee: M & J Scientific, LLC, Cleveland, TX (US)

( * ) Notice: Subject to any disclaimer, the term of this patent is extended or adjusted under 35 U.S.C. 154(b) by 82 days.

(21) Appl. No.: 17/470,280

(22) Filed: Sep. 9, 2021

(65) Prior Publication Data

US 2021/0404941 A1   Dec. 30, 2021

Related U.S. Application Data

(63) Continuation of application No. 16/758,721, filed as application No. PCT/US2019/012095 on Jan. 2, 2019, now Pat. No. 11,150,175.

(51) Int. Cl.
*G01N 15/14* (2006.01)
*G01N 30/74* (2006.01)

(52) U.S. Cl.
CPC ......... *G01N 15/1429* (2013.01); *G01N 30/74* (2013.01)

(58) Field of Classification Search
CPC .............. G01N 15/1429; G01N 30/74; G01N 2015/03; G01N 30/86; G01N 21/53;
(Continued)

(56) References Cited

U.S. PATENT DOCUMENTS

| 3,826,577 A | 7/1974 | Irwin |
| 4,463,598 A | 8/1984 | Haney |

(Continued)

FOREIGN PATENT DOCUMENTS

| CH | 653132 A5 | 12/1985 |
| CN | 101118210 A | 2/2008 |

(Continued)

OTHER PUBLICATIONS

International Search Report and Written Opinion dated Mar. 22, 2019 for International Application No. PCT/US2019/012095 (Authorized officer, Shane Thomas), 10 pages.

(Continued)

*Primary Examiner* — Roy M Punnoose
(74) *Attorney, Agent, or Firm* — MH2 Technology Law Group, LLP

(57) ABSTRACT

Methods for determining a radius of gyration of a particle in solution using a light scattering detector are provided. The method may include passing the solution through a flowpath in a sample cell, determining respective angular normalization factors for first and second angles of the detector, obtaining a first scattering intensity of the particle in solution at the first angle, obtaining a second scattering intensity of the particle in solution at the second angle, obtaining a 10° scattering intensity of the particle in solution at an angle of about 10°, determining a first particle scattering factor, determining a second particle scattering factor, plotting an angular dissymmetry plot, fitting a line to the angular dissymmetry plot, determining a slope of the line at a selected location on the line, determining the radius of gyration of the particle in solution from the slope of the line, and outputting the radius of gyration.

20 Claims, 6 Drawing Sheets

(58) Field of Classification Search
CPC .......... G01N 21/05; G01N 21/51; G01N 2021/4704; G01N 2021/513
See application file for complete search history.

(56) References Cited

U.S. PATENT DOCUMENTS

| | | | |
|---|---|---|---|
| 4,616,927 A | 10/1986 | Phillips et al. | |
| 4,747,687 A | 5/1988 | Hoppe et al. | |
| 4,790,653 A | 12/1988 | North, Jr. | |
| 4,907,884 A | 3/1990 | Wyatt et al. | |
| 5,040,890 A | 8/1991 | North, Jr. | |
| 6,064,945 A | 5/2000 | Gorenstein et al. | |
| 6,229,146 B1 | 5/2001 | Cochran et al. | |
| 7,782,459 B2 * | 8/2010 | Holve | G01N 15/0205 356/336 |
| 7,982,875 B2 | 7/2011 | Trainoff | |
| 10,209,176 B2 | 2/2019 | Proskurowski et al. | |
| 10,935,479 B2 * | 3/2021 | Frese | G01N 15/0205 |
| 11,150,175 B2 * | 10/2021 | Haney | G01N 30/86 |
| 2008/0285032 A1 | 11/2008 | Ohkubo | |
| 2009/0079981 A1 * | 3/2009 | Holve | G01N 15/0205 356/336 |
| 2011/0235030 A1 | 9/2011 | Champseix et al. | |
| 2013/0308121 A1 | 11/2013 | Some et al. | |
| 2016/0167061 A1 | 6/2016 | McNaughton et al. | |
| 2017/0362304 A1 | 12/2017 | Fukuda et al. | |
| 2018/0180523 A1 * | 6/2018 | Frese | G01N 15/0205 |
| 2019/0234852 A1 * | 8/2019 | Scullion | G01N 21/49 |

FOREIGN PATENT DOCUMENTS

| | | |
|---|---|---|
| CN | 204666513 U | 9/2015 |
| CN | 105277472 A | 1/2016 |
| CN | 107076670 A | 8/2017 |
| CN | 108367256 A | 8/2018 |
| CN | 108603825 A | 9/2018 |
| DE | 3630292 C1 | 2/1988 |
| EP | 1 182 443 A2 | 2/2002 |
| JP | 49-90584 | 8/1974 |
| JP | 49-105585 A | 10/1974 |
| WO | 2002077671 A2 | 10/2002 |
| WO | 2012/137750 A1 | 10/2012 |
| WO | 2018007328 A1 | 1/2018 |
| WO | 2018/069024 A1 | 4/2018 |

OTHER PUBLICATIONS

International Search Report and Written Opinion dated Mar. 15, 2019 for International Application No. PCT/US2019/012090 (Authorized officer, Shane Thomas), 11 pages.

Extended Search Report dated Apr. 26, 2021 for European Application No. 19853280.6, 8 pages.

Extended Search Report dated Jun. 11, 2021 for corresponding European Application No. 19853281.4, 6 pages.

Liu et al., "Determination of molecular weight and molecular sizes of polymers by high temperature gel permeation chromatography with a static and dynamic laser light scattering detector", Polymer, 2003, vol. 44, No. 23, pp. 7209-7220.

Regina A Murphy, Static and dynamic light scattering of biological maromoleules: what can we learn?",Current Opinion in Biotechnology", 1997, vol. 8, No. 1 pp. 25-30.

Sloot et al., "Elastic light scattering from nucleated blood cells: rapid numerical analysis", Applied Optics, 1986, vol. 25, No. 19, pp. 3559-3565.

* cited by examiner

METHODS OF DETERMINING RADIUS OF GYRATION OF A PARTICLE USING LIGHT SCATTERING DETECTORS

CROSS-REFERENCE TO RELATED APPLICATIONS

This application is a Continuation of U.S. application Ser. No. 16/758,721 (Allowed) filed 23 Apr. 2020, which is a U.S. National Stage application of PCT/US2019/012095 filed 2 Jan. 2019, the entire disclosure of which is incorporated herein by reference.

BACKGROUND

Conventional light scattering detectors are often utilized in conjunction with chromatographic techniques to determine one or more physical attributes or characteristics of various molecules or solutes suspended in solutions. For example, light scattering detectors are often utilized with gel permeation chromatography (GPC) to determine a molecular weight and a radius of gyration of various particles, such as polymers. In light scattering detectors, a sample or effluent containing molecules (e.g., polymers) is flowed through a sample cell from an inlet to an outlet disposed at opposing ends thereof. As the effluent is flowed through the sample cell, the effluent is illuminated by a collimated beam of light (e.g., laser). The interaction of the beam of light and the polymers of the effluent produces scattered light. The scattered light is then measured and analyzed for varying attributes, such as intensity and angle, to determine the physical characteristics of the polymers.

While conventional light scattering detectors have proven to be effective for determining the physical attributes of a wide variety of molecules, conventional light scattering detectors are limited in their ability to analyze small molecules. For example, conventional light scattering detectors often lack the sensitivity and/or resolution to measure Rg of molecules having a radius of gyration of less than about 10 nm. In view of the foregoing, conventional light scattering detectors often incorporate lasers having relatively greater power or energy to increase the sensitivity of the detectors. Incorporating lasers with greater power, however, is cost prohibitive and often requires larger instruments due to the relatively larger footprint of the lasers. Alternatively, the volume of the sample cells in conventional light scattering detectors can been increased to increase the intensity of scattered light. Increasing the volume of conventional sample cells, however, leads to excessive peak broadening.

What is needed, then, are improved light scattering detectors and sample cells thereof, methods for increasing the sensitivity and/or resolution of the light scattering detectors without increasing peak broadening, and improved methods for determining a radius of gyration of a particle.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a method for determining a radius of gyration (Rg) of a particle in solution using a light scattering detector. The method may include passing the particle in solution through a flowpath in a sample cell, wherein the flowpath has a centerline aligned with a beam of light of the detector. The method may also include determining an angular normalization factor ($N_{\theta 1}$) for a first angle of the detector and an angular normalization factor ($N_{\theta 2}$) of a second angle of the detector, wherein the first angle is about 90° relative to the centerline, and wherein the second angle is about 170° relative to the centerline. The method may also include obtaining a first scattering intensity ($I_{\theta 1}$) of the particle in solution at the first angle. The method may also include obtaining a second scattering intensity ($I_{\theta 2}$) of the particle in solution at the second angle. The method may also include obtaining a 10° scattering intensity ($I_{10}$) of the particle in solution at an angle of about 10°. The method may also include determining a first particle scattering factor ($P_{\theta 1}$) with the first scattering intensity ($I_{\theta 1}$), the 10° scattering intensity ($I_{10}$), and the angular normalization factor ($N_{\theta 1}$) for the first angle. The method may also include determining a second particle scattering factor ($P_{\theta 2}$) with the second scattering intensity ($I_{\theta 2}$), the 10° scattering intensity ($I_{10}$), and the angular normalization factor ($N_{\theta 2}$) for the second angle. The method may also include plotting an angular dissymmetry plot, wherein the angular dissymmetry plot comprises the first particle scattering factor ($P_{\theta 1}$) and the second particle scattering factor ($P_{\theta 2}$). The method may also include fitting a line to the angular dissymmetry plot. The method may also include determining a slope of the line at a selected location on the line. The method may also include determining the radius of gyration (Rg) of the particle in solution from the slope of the line. The method may also include outputting the radius of gyration (Rg).

In at least one implementation, determining the angular normalization factor of the first and second angles of the detector may include passing each of a plurality of known particles in solution through the flowpath of the sample cell. Determining the angular normalization factor of the first and second angles of the detector may also include obtaining scattering intensity values for each of the plurality of known particles in solution at an angle of about 10°, at the first angle, and at the second angle. Determining the angular normalization factor of the first and second angles of the detector may also include determining the angular normalization factor ($N_{\theta 1}$) for the first angle with a plot of a ratio of the scattering intensity values of each of the plurality of known particles at the first angle to the scattering intensity values of each of the plurality of known particles at an angle of about 10°. Determining the angular normalization factor of the first and second angles of the detector may also include determining the angular normalization factor ($N_{\theta 2}$) for the second angle with a plot of a ratio of the scattering intensity values of each of the plurality of known particles at the second angle to the scattering intensity values of each of the plurality of known particles at an angle of about 10°.

In at least one implementation, each of the plurality of known particles in solution have a known molecular weight.

In at least one implementation, the first particle scattering factor ($P_{\theta 1}$) is in the form $$P_{\theta 1} = \frac{\left(\frac{I_{\theta 1}}{I_{10}}\right)}{N_{\theta 1}},$$

where: $I_{\theta 1}$ is the scattering intensity of the particle in solution at the first angle; $I_{10}$ is the scattering intensity of the particle in solution at an angle of about 10°; and $N_{\theta 1}$ is the angular normalization factor for the first angle.

In at least one implementation, the second particle scattering factor ($P_{\theta 2}$) is in the form $$P_{\theta 2} = \frac{\left(\frac{I_{\theta 2}}{I_{10}}\right)}{N_{\theta 2}},$$

where: $I_{\theta 2}$ is the scattering intensity of the particle in solution at the second angle; $I_{10}$ is the scattering intensity of the particle in solution at an angle of about 10°; and $N_{\theta 2}$ is the angular normalization factor for the second angle.

In at least one implementation, plotting the angular dissymmetry plot comprises: plotting a first point on a plane, the first point comprising a first coordinate and a second coordinate, wherein the first coordinate of the first point is the first particle scattering factor ($P_{\theta 1}$), and wherein the second coordinate of the first point is in the form $$\mu_{\theta 1}^2 = \left(\frac{4\pi n_0 \sin\frac{\theta 1}{2}}{\lambda}\right)^2,$$

where: $n_0$ is a refractive index of the solution; $\theta_1$ is the first angle; and $\lambda$ is a wavelength of the beam of light; plotting a second point on the plane, the second point comprising a first coordinate and a second coordinate, wherein the first coordinate of the second point is the second particle scattering factor ($P_{\theta 2}$), and wherein the second coordinate of the second point is in the form $$\mu_{\theta 2}^2 = \left(\frac{4\pi n_0 \sin\frac{\theta_2}{2}}{\lambda}\right)^2,$$

where: $n_0$ is a refractive index of the solution; $\theta_2$ is the second angle; and $\lambda$ is the wavelength of the beam of light.

In at least one implementation, fitting the line to the angular dissymmetry plot comprises a least squares fitting. The line may include a polynomial degree of less than three.

The foregoing and/or other aspects and utilities embodied in the present disclosure may be achieved by providing a method for determining a radius of gyration (Rg) of a particle in solution using a light scattering detector. The method may include passing the particle in solution through a flowpath in a sample cell, wherein the flowpath has a centerline aligned with a beam of light of the detector. The method may also include determining an angular normalization factor ($N_{\theta 1}$) for a first angle of the detector, wherein the first angle is either about 90° or about 170° relative to the centerline. The method may also include obtaining a first scattering intensity ($I_{\theta 1}$) of the particle in solution at the first angle. The method may also include obtaining a 10° scattering intensity ($I_{10}$) of the particle in solution at an angle of about 10° or less. The method may also include determining a first particle scattering factor ($P_{\theta 1}$) with the first scattering intensity ($I_{\theta 1}$), the 10° scattering intensity ($I_{10}$), and the angular normalization factor ($N_{\theta 1}$) for the first angle. The method may also include plotting an angular dissymmetry plot, wherein the angular dissymmetry plot comprises the first particle scattering factor ($P_{\theta 1}$). The method may also include fitting a line to the angular dissymmetry plot. The method may also include determining a slope of the line at a selected location on the line. The method may also include determining the radius of gyration (Rg) of the particle in solution from the slope of the line. The method may also include outputting the radius of gyration.

In at least one implementation, determining the angular normalization factor ($N_{\theta 1}$) for the first angle of the detector comprises: passing each of a plurality of known particles in solution through the flowpath of the sample cell; obtaining scattering intensity values of each of the plurality of known particles in solution at an angle of about 10° and at the first angle; and determining the angular normalization factor ($N_{\theta 1}$) for the first angle with a plot of a ratio of the scattering intensity values of each of the plurality of known particles at the first angle to the scattering intensity values of each of the plurality of known particles at an angle of about 10° with respect to a respective weight average molecular weight of each of the plurality of known particles in solution.

In at least one implementation, each of the plurality of known particles in solution have a known molecular weight.

In at least one implementation, the first particle scattering factor ($P_{\theta 1}$) is in the form $$P_{\theta 1} = \frac{\left(\frac{I_{\theta 1}}{I_{10}}\right)}{N_{\theta 1}},$$

where: $I_{\theta 1}$ is the scattering intensity of the particle in solution at the first angle; $I_{10}$ is the scattering intensity of the particle in solution at an angle of about 10°; and $N_{\theta 1}$ is the angular normalization factor for the first angle.

In at least one implementation, plotting the angular dissymmetry plot comprises: plotting a first point on a plane, the first point comprising a first coordinate and a second coordinate, wherein the first coordinate of the first point is the first particle scattering factor ($P_{\theta 1}$), and wherein the second coordinate of the first point is in the form $$\mu_{\theta 1}^2 = \left(\frac{4\pi n_0 \sin\frac{\theta_1}{2}}{\lambda}\right)^2,$$

where: $n_0$ is a refractive index of the solution; $\theta_1$ is the first angle; and $\lambda$ is a wavelength of the beam of light.

In at least one implementation, the line of the angular dissymmetry plot is a straight line.

In at least one implementation, the radius of gyration (Rg) of the particle in solution is less than 10 nm.

In at least one implementation, the method may further include: obtaining an angular normalization factor ($N_{\theta 2}$) of a second angle of the detector, wherein second angle is either about 90° or about 170° relative to the centerline, and wherein the second angle is different from the first angle; obtaining a second scattering intensity ($I_{\theta 2}$) of the particle in solution at the second angle; and determining a second particle scattering factor ($P_{\theta 2}$) with the second scattering intensity ($I_{\theta 2}$), the 10° scattering intensity ($I_{10}$), and the angular normalization factor ($N_{\theta 2}$) for the second angle. The angular dissymmetry plot may further comprise the second particle scattering factor ($P_{\theta 2}$).

In at least one implementation, determining the angular normalization factor of the second angle of the detector comprises: obtaining scattering intensity values of each of the plurality of known particles in solution at the second angle; and determining the angular normalization factor ($N_{\theta2}$) for the second angle with a plot of a ratio of the scattering intensity values of each of the plurality of known particles at the second angle to the scattering intensity values of each of the plurality of known particles at an angle of about 10° with respect to a respective weight average molecular weight of each of the plurality of known particles in solution.

In at least one implementation, the second particle scattering factor ($P_{\theta2}$) is in the form $$P_{\theta2} = \frac{\left(\frac{I_{\theta2}}{I_{10}}\right)}{N_{\theta2}},$$

where: $I_{\theta2}$ is the scattering intensity of the particle in solution at the second angle; $I_{10}$ is the scattering intensity of the particle in solution at an angle of about 10°; and $N_{\theta2}$ is the angular normalization factor for the second angle.

In at least one implementation, plotting the angular dissymmetry plot further comprises: plotting a second point on the plane, the second point comprising a first coordinate and a second coordinate, wherein the first coordinate of the second point is the second particle scattering factor ($P_{\theta2}$), and wherein the second coordinate of the second point is in the form $$\mu_{\theta2}^2 = \left(\frac{4\pi n_0 \sin\frac{\theta_2}{2}}{\lambda}\right)^2,$$

where: $n_0$ is a refractive index of the solution; $\theta_2$ is the second angle; and $\lambda$ is the wavelength of the beam of light.

In at least one implementation, the line of the angular dissymmetry plot is a curved line.

In at least one implementation, the radius of gyration (Rg) of the particle in solution is less than 100 nm, optionally greater than 10 nm.

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

BRIEF DESCRIPTION OF THE DRAWINGS

The accompanying drawings, which are incorporated in and constitute a part of this specification, illustrate varying implementations of the present disclosure. These and/or other aspects and advantages in the implementations of the disclosure will become apparent and more readily appreciated from the following description of the various implementations, taken in conjunction with the accompanying drawings. It should be noted that some details of the drawings have been simplified and are drawn to facilitate understanding of the present disclosure rather than to maintain strict structural accuracy, detail, and scale. These drawings/figures are intended to be explanatory and not restrictive.

DETAILED DESCRIPTION

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

All references cited herein are hereby incorporated by reference in their entireties. In the event of a conflict in a definition in the present disclosure and that of a cited reference, the present disclosure controls.

As used herein, the term or expression "sensitivity" may refer to the ratio of signal to noise. It should be appreciated by one having ordinary skill in the art that increasing laser power does not necessarily improve the sensitivity.

Figure 1A:
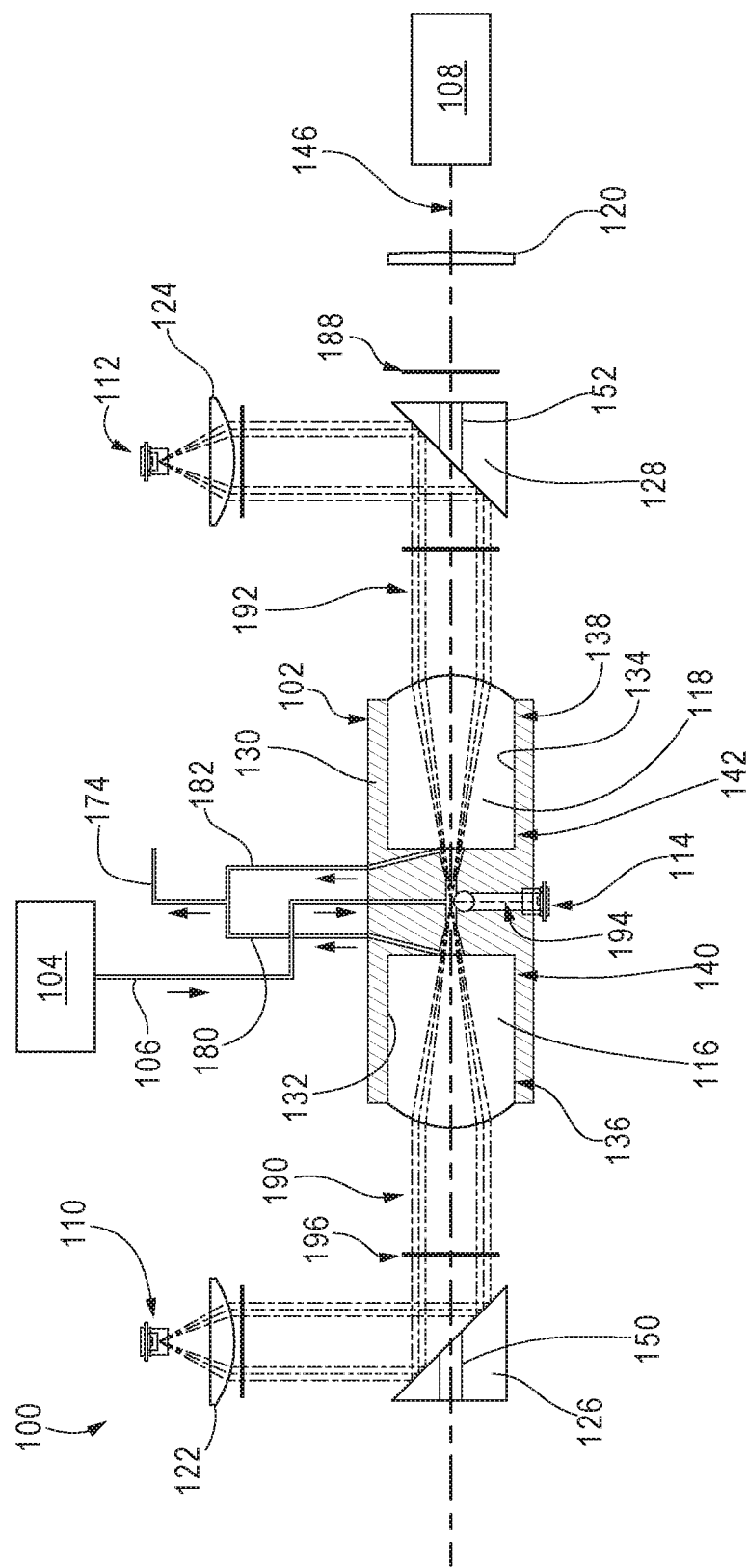
FIG. 1A illustrates a schematic view of an exemplary light scattering detector including an exemplary sample cell, according to one or more implementations disclosed.

FIG. 1A illustrates a schematic view of an exemplary light scattering detector (LSD) 100 including an exemplary sample cell 102, according to one or more implementations. The LSD 100 may be operably coupled with a sample source or device 104, and capable of or configured to receive a sample or effluent therefrom. For example, as illustrated in FIG. 1A, the LSD 100 may be fluidly coupled with the sample source or device 104 via line 106 and configured to receive the effluent therefrom. Illustrative sample sources or devices 104 may include, but are not limited to, a chromatography instrument capable of or configured to separate one or more analytes of a sample or eluent from one another. For example, the sample source or device 104 may be a liquid chromatography instrument capable of or configured to separate the analytes of the eluent from one another based on their respective charges (e.g., ion exchange chromatography), sizes (e.g., size-exclusion or gel permeation chromatography), or the like. In an exemplary implementation, the LSD 100 is operably coupled with a liquid chromatography instrument configured to separate the analytes from one another based on their respective sizes. For example, the LSD 100 is operably coupled with a liquid chromatography instrument including gel permeation chromatography columns.

The LSD 100 may include the exemplary sample cell 102, a collimated beam of light source, such as a laser 108, and one or more detectors 110, 112, 114 (three are shown) operably coupled with one another. The detectors 110, 112, 114 may be any suitable detector capable of or configured to receive analyte scattered light. For example, any one or more of the detectors 110, 112, 114 may be a photo-detector, such as a silicon photo-detector. The LSD 100 may include one or more lenses 116, 118, 120, 122, 124 (five are shown) capable of or configured to refract, focus, attenuate, and/or collect light transmitted through the LSD 100, and one or more mirrors 126, 128 (two are shown) capable of or configured to reflect or redirect the light transmitted through the LSD 100.

Figure 1B:
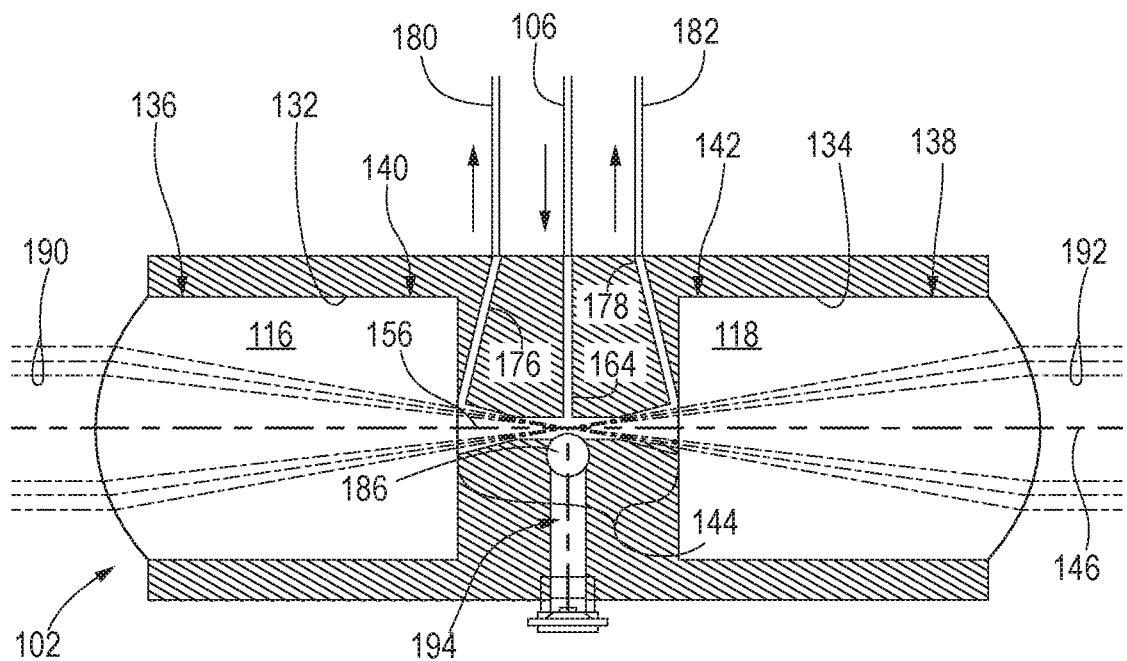
FIG. 1B illustrates a schematic view of the exemplary sample cell of FIG. 1A, according to one or more implementations disclosed.

In at least one implementation, a first lens 116 and a second lens 118 may be disposed on opposing sides or axial ends of the sample cell 102 and configured to refract, focus, attenuate, and/or collect light transmitted therethrough. In another implementation, a body 130 of the sample cell 102 may define recesses 132, 134 configured to receive the first and second lenses 116, 118. For example, as illustrated in FIG. 1A and further illustrated in detail in FIG. 1B, the body 130 of the sample cell 102 may define a first recess 132 and a second recess 134 extending longitudinally or axially therethrough, and configured to receive the first lens 116 and the second lens 118, respectively. As illustrated in FIGS. 1A and 1B, each of the first and second lenses 116, 118 may define a convex surface along respective first or outer end portions 136, 138 thereof. While the first end portions 136, 138 of the first and second lenses 116, 118 are illustrated as defining convex surfaces, it should be appreciated that any one of the respective first end portions 136, 138 of the first and second lenses 116, 118 may alternatively define a flat surface. As further illustrated in FIG. 1A, each of the first and second lenses 116, 118 may define a flat surface along respective second or inner end portions 140, 142 thereof. As further described herein, the respective second end portions 140, 142 of the first and second lenses 116, 118 may seal and/or at least partially define a channel or flowpath 144 extending through the sample cell 102.

The laser 108 may be any suitable laser capable of or configured to provide a beam of light 146 having sufficient wavelength and/or power. For example, the laser 108 may be a diode laser, a solid state laser, or the like. The laser 108 may be configured to emit the beam of light 146 through the sample cell 102. For example, as illustrated in FIG. 1A, the laser 108 may be arranged or disposed about the LSD 100 such that the beam of light 146 emitted therefrom is transmitted through the sample cell 102. As further illustrated in FIG. 1A, a third lens 120 may be interposed between the sample cell 102 and the laser 108 and configured to focus the beam of light 146 directed to and through the sample cell 102.

In at least one implementation, at least one of the mirrors 126, 128 may be associated with a respective detector 110, 112, and configured to reflect or redirect the light (e.g., scattered light or analyte scattered light) towards the respective detector 110, 112. For example, as illustrated in FIG. 1A, a first mirror 126 may be disposed proximal the first lens 116 and configured to reflect at least a portion of the light from the first lens 116 towards a first detector 110. In another example, a second mirror 128 may be disposed proximal the second lens 118 and/or interposed between the second and third lenses 118, 120, and configured to reflect at least a portion of the light from the second lens 118 towards a second detector 112. In at least one implementation, one or more lenses 122, 124 may be interposed between the first and second mirrors 126, 128 and the first and second detectors 110, 112 to focus, refract, or otherwise direct the light from the mirrors 126, 128 to the detectors 110, 112. For example, as illustrated in FIG. 1A, a fourth lens 122 may be interposed between the first detector 110 and the first mirror 126, and a fifth lens 124 may be interposed between the second detector 112 and the second mirror 128.

In at least one implementation, at least one of the detectors 110, 112, 114 may be configured to receive the light (e.g., scattered light or analyte scattered light) from the sample cell 102 without the aid or reflection of one of the mirrors 126, 128. For example, as illustrated in FIGS. 1A and 1B, a third detector 114 may be disposed adjacent to or coupled with the sample cell 102 and configured to receive the light (e.g., scattered light) from the sample cell 102 at an angle of about 90° with respect to the beam of light 146. As further discussed herein, an optically transparent material or a sixth lens 186 may be configured to refract or direct the scattered light toward the third detector 114.

As illustrated in FIG. 1A, at least one of the sample cell 102, the first, second, and third lenses 116, 118, 120, and the first and second mirrors 126, 128 may be disposed parallel, coaxial, or otherwise aligned with one another along a direction of the beam of light 146 emitted by the laser 108. As further illustrated in FIG. 1A, each of the first and second detectors 110, 112 may be disposed or positioned to receive light (e.g., scattered light or analyte scattered light) from the respective mirrors 126, 128 in a direction generally perpendicular to the beam of light 146 emitted by the laser 108. Each of the first and second mirrors 126, 128 may define a respective bore or pathway 150, 152 extending therethrough. For example, the first mirror 126 may define a bore 150 extending therethrough in a direction parallel, coaxial, or otherwise aligned with the beam of light 146. Similarly, the second mirror 128 may define a bore 152 extending therethrough in the direction parallel, coaxial, or otherwise aligned with the beam of light 146. It should be appreciated that the bores 150, 152 extending through the respective mirrors 126, 128 may allow the beam of light 146 emitted from the laser 108 to be transmitted through the first and second mirrors 126, 128 to thereby prevent the beam of light 146 from being reflected towards the first and second detectors 110, 112.

Figure 1C:
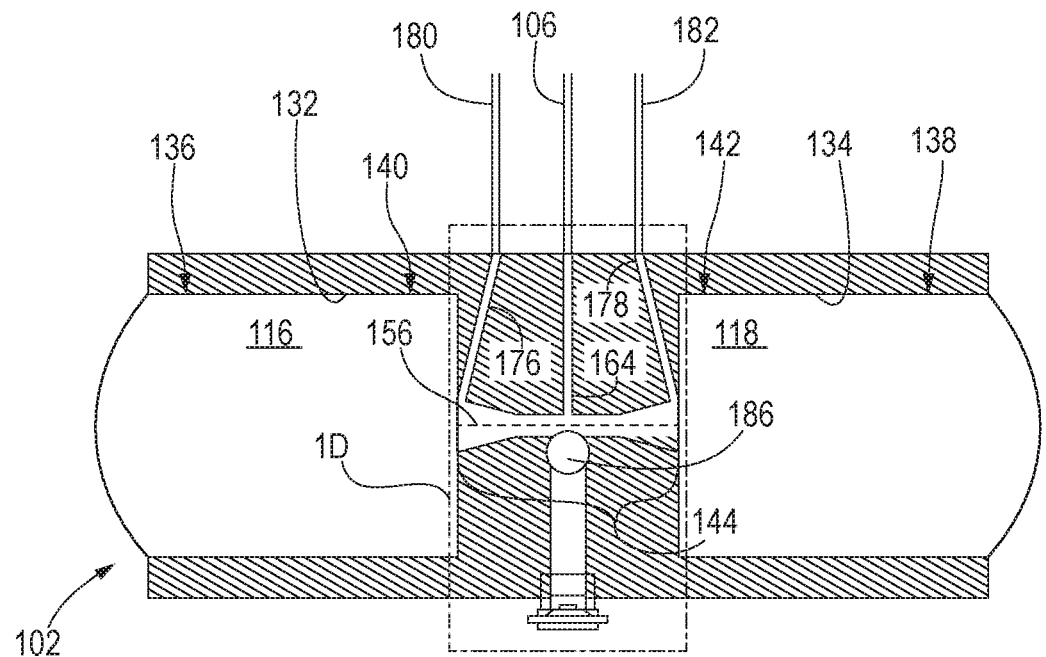
FIG. 1C illustrates the schematic view of the exemplary sample cell of FIG. 1A without the analyte scattered light, according to one or more implementations disclosed.
Figure 1D:
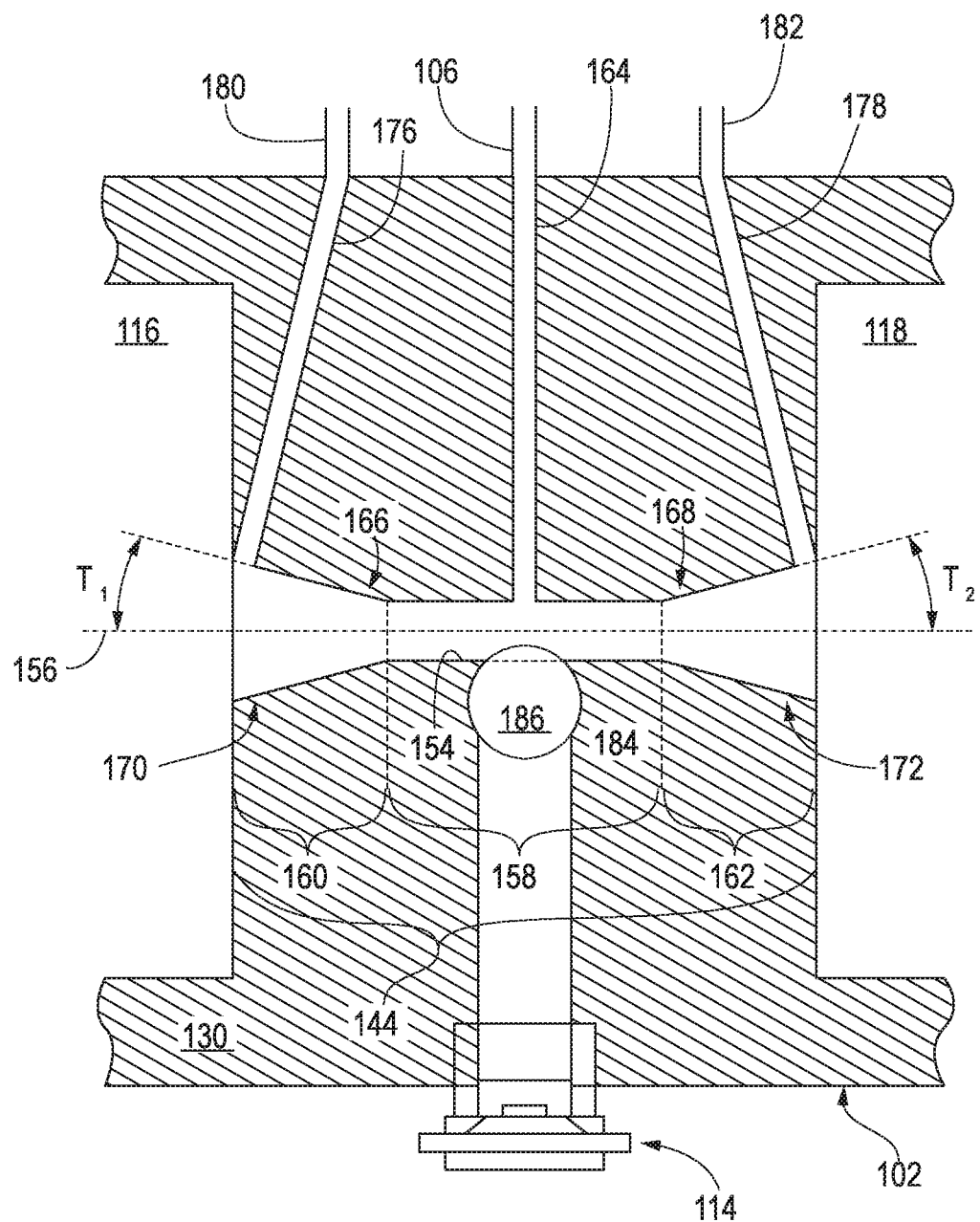
FIG. 1D illustrates an enlarged view of the portion of the sample cell indicated by the box labeled 1D in FIG. 1C, according to one or more implementations disclosed.

FIG. 1D illustrates an enlarged view of the portion of the exemplary LSD 100 indicated by the box labeled 1D of FIG. 1C, according to one or more implementations. As previously discussed, the body 130 of the sample cell 102 may at least partially define the channel or flowpath 144 extending therethrough. For example, as illustrated in FIG. 1D, an inner surface 154 of the body 130 may at least partially define the flowpath 144 extending therethrough. The flowpath 144 may define a volume of the sample cell 102. The flowpath 144 may include a central axis or centerline 156 extending therethrough and configured to define a general orientation of the flowpath 144. As illustrated in FIG. 1B, the flowpath 144 and the central axis 156 thereof may be aligned or coaxial to the beam of light 146 emitted from the laser 108. The flowpath 144 of the sample cell 102 may be interposed between the first and second lenses 116, 118. In at least one implementation, the first and second lenses 116, 118 may sealingly engage the body 130 of the sample cell 102 on opposing sides thereof to thereby prevent a flow of the sample or effluent from the flowpath 144 via the interface between the body 130 and the respective first and second lenses 116, 118. In another implementation, a seal (e.g., gasket, O-ring, etc.) (not shown) may be disposed between the body 130 and the first and second lenses 116, 118 to provide a fluid tight seal therebetween.

The flowpath 144 may include an inner section 158 and two outer sections 160, 162 disposed along the centerline 156 thereof. As illustrated in FIG. 1D, the inner section 158 may be interposed between the two outer sections 160, 162. The inner section 158 may be fluidly coupled with and configured to receive a sample or effluent from the sample source 104. For example, as illustrated in FIG. 1D with continued referenced to FIG. 1A, the body 130 of the sample cell 102 may define an inlet 164 extending therethrough and configured to fluidly couple the sample source 104 with the inner section 158 via line 106. In a preferred implementation, the inlet 164 is configured such that the sample from the sample source 104 is directed to the middle or center of the flowpath 144 or the inner section 158 thereof.

In at least one implementation, the inner section 158 may be cylindrical or define a cylindrical volume, and may have a circular cross-sectional profile. It should be appreciated, however, that the cross-sectional profile may be represented by any suitable shape and/or size. For example, the cross-sectional profile may be elliptical, rectangular, such as a rounded rectangle, or the like. The inner section 158 may have any suitable dimension. In at one implementation, the inner section 158 may have a length extending between the two outer sections 160, 162 of from about 4 mm to about 12 mm or greater. For example, the inner section 158 may have a length of from about 4 mm, about 5 mm, about 6 mm, about 7 mm, or about 7.5 mm to about 8.5 mm, about 9 mm, about 10 mm, about 11 mm, about 12 mm, or greater. In another example, the inner section 158 may have a length of from about 4 mm to about 12 mm, about 5 mm to about 11 mm, about 6 mm to about 10 mm, about 7 mm to about 9 mm, or about 7.5 mm to about 8.5 mm. In a preferred implementation, the inner section 158 may have a length of from about 7 mm to about 9 mm, preferably about 7.5 mm to about 8.5 mm, more preferably about 8 mm. In at least one implementation, the inner section 158 may have a diameter of from about 1.2 mm to about 2.0 mm or greater. For example, the inner section 158 may have a diameter of from about 1.2 mm, about 1.3 mm, about 1.4 mm, about 1.5 mm, or about 1.55 mm to about 1.65 mm, about 1.7 mm, about 1.8 mm, about 1.9 mm, about 2.0 mm, or greater. In another example, the inner section 158 may have a diameter of from about 1.2 mm to about 2.0 mm, about 1.3 mm to about 1.9 mm, about 1.4 mm to about 1.8 mm, about 1.5 mm to about 1.7 mm, or about 1.55 mm to about 1.65 mm. In a preferred implementation, the inner section 158 may have a diameter of from about 1.5 mm to about 1.7 mm, preferably about 1.55 mm to about 1.65 mm, more preferably about 1.6 mm.

The outer sections 160, 162 of the flowpath 144 may be fluidly coupled with the inner section 158 and configured to receive the sample or effluent therefrom. In at least one implementation, at least one of the first and second outer sections 160, 162 may be cylindrical or define a cylindrical volume, and may have a circular cross-sectional profile. For example, at least one of the first and second outer sections 160, 162 may be sized and shaped similar to the inner section 158 of FIG. 1D. In another implementation, at least one of the first and second outer sections 160, 162 may be conical or frustoconical such that a cross-sectional area at a respective first end portion or inlet 166, 168 thereof may be relatively less than a cross-sectional area at a respective second end portion or outlet 170, 172 thereof. In a preferred implementation, the first and second outer sections 160, 162 may both be frustoconical or define a frustum, where the respective first end portions or inlets 166, 168 are configured to receive the sample from the inner section 158, and the respective second end portions or outlets 170, 172 are configured to deliver the sample to a waste line 174 (see FIG. 1A).

The inner surface 154 of the body 130 may at least partially define respective taper angles ($\theta_1$, $\theta_2$) of the first outer section 160 and the second outer section 162. For example, as illustrated in FIG. 1D, the portion of the inner surface 154 defining or forming the first outer section 160 of the flowpath 144 and the centerline 156 of the flowpath 144 may define the respective taper angle ($\theta_1$) of the first outer section 160. In another example, the portion of the inner surface 154 defining or forming the second outer section 162 of the flowpath 144 and the centerline 156 of the flowpath 144 may define the respective taper angle ($\theta_2$) of the second outer section 162. The first and second outer sections 160, 162 may have any taper angles ($\theta_1$, $\theta_2$) capable of or configured to allow the LSD 100 and the detectors 110, 112, 114 thereof to receive scattered light at any desired angle. While FIG. 1D illustrates the taper angles ($\theta_1$, $\theta_2$) of the first and second outer sections 160, 162 to be relatively equal to one another, it should be appreciated that one of the taper angles ($\theta_1$, $\theta_2$) may be relatively greater than the other. It should further be appreciated that than any one or more attributes (e.g., length, taper angle, diameter, shape, size, etc.) of the first and second outer sections 160, 162 may be different. In a preferred implementation, the attributes (e.g., length, taper angle, diameter, shape, size, etc.) of the first outer section 160 and the second outer section 162 are the same or substantially the same.

Each of the outer sections 160, 162 may be fluidly coupled with the waste line 174. For example, as illustrated in FIGS. 1A and 1D, the body 130 may define a first outlet 176 and a second outlet 178 extending therethrough and configured to fluidly couple the first outer section 160 and the second outer section 162 with the waste line 174 via a first outlet line 180 and a second outlet line 182, respectively. As further illustrated in FIG. 1D, the first and second outlets 176, 178 may be fluidly coupled with the respective second end portions 170, 172 of the outer sections 160, 162. It should be appreciated that the orientation (e.g., circumferential orientation) or location of the inlet 164 and the first and second outlets 176, 178 may vary. For example, the inlet 164 may be circumferentially aligned with at least one of the first and second outlets 176, 178. In another example, the inlet 164 may be circumferentially offset from at least one of the first and second outlets 176, 178. In yet another example, the first and second outlets 176, 178 may be circumferentially aligned with one another or circumferentially offset from one another.

As illustrated in FIG. 1D, the body 130 of the sample cell 102 may define an aperture 184 extending through at least a portion thereof, and configured to allow light (e.g., scattered light) from the inner section 158 to be directed or transmitted to the third detector 114. The aperture 184 may be sealed with an optically transparent material 186, such as a quartz crystal, to thereby allow the light from the inner section 158 to be directed to the third detector 114. In an exemplary implementation, illustrated in FIGS. 1B and 1D, the optically transparent material 186 may be shaped to refract a portion of the light towards the third detector 114. For example, the optically transparent material 186 may be the sixth lens (e.g., a ball lens) configured to seal the aperture 184 and at least partially refract the light towards the third detector 114.

The body 130 may include or be fabricated from any suitable material. The body 130 may be configured such that the inner surface 154 thereof attenuates the reflection of light. For example, the body 130 may be fabricated from a non-reflective material. In another example, the body 130 may be at least partially fabricated from a reflective material and at least partially coated with a non-reflective material. In at least one implementation, the sample cell 102 may be fabricated from quartz, such as black quartz. In an exemplary implementation, the body 130 may include or be fabricated from a polymer. Illustrative polymers may be or include, but are not limited to, polyolefin-based polymers, acryl-based polymers, polyurethane-based polymers, ether-based polymers, polyester-based polymers, polyamide-based polymers, formaldehyde-based polymers, silicon-based polymers, any copolymers thereof, or any combination thereof. For example, the polymers may include, but are not limited to, poly(ether ether ketone) (PEEK), TORLON®, polyamide-imides, polyethylene (PE), polyvinyl fluoride (PVF), polyvinyl chloride (PVC), polyvinylidene fluoride (PVDF), polyvinylidene chloride (PVDC), polychlorotrifluoroethylene (PCTFE), polytetrafluoroethylene (PTFE), polypropylene (PP), poly(1-butene), poly(4-methylpentene), polystyrene, polyvinyl pyridine, polybutadiene, polyisoprene, polychloroprene, styrene-acrylonitrile copolymer, acrylonitrile-butadiene-styrene terpolymer, ethylene-methacrylic acid copolymer, styrene-butadiene rubber, tetrafluoroethylene copolymer, polyacrylate, polymethacrylate, polyacrylamide, polyvinyl acetate, polyvinyl alcohol, polyvinyl butyral, polyvinyl ether, polyvinylpyrrolidone, polyvinylcarbazole, polyurethane, polyacetal, polyethylene glycol, polypropylene glycol, epoxy resins, polyphenylene oxide, polyethylene terephthalate, polybutylene terephthalate, polydihydroxymethylcyclohexyl terephthalate, cellulose esters, polycarbonate, polyamide, polyimide, any copolymers thereof, or any combination thereof. The polymers may be or include, but are not limited to, elastomers or elastomeric materials, synthetic rubber, or the like. Illustrative elastomeric materials and synthetic rubbers may include, but are not limited to, VITON®, nitrile, polybutadiene, acrylonitrile, polyisoprene, neoprene, butyl rubber, chloroprene, polysiloxane, styrene-butadiene rubber, hydrin rubber, silicone rubber, ethylene-propylene-diene terpolymers, any copolymers thereof, or any combination thereof.

In an exemplary operation of the LSD 100, with continued reference to FIGS. 1A-1D, the sample source 104 (e.g., a liquid chromatograph including a gel permeation chromatography column) may inject or direct the sample or effluent (e.g., dilute particle and/or polymer solution) to and through the flowpath 144 of the sample cell 102 via line 106 and the inlet 164. As illustrated in FIG. 1D, the sample from the sample source 104 may be directed toward a center or middle of the flowpath 144 and/or the inner section 158 of the sample cell 102. As the sample flows to the center of the inner section 158, the flow of the of sample may split such that a first portion of the sample flows towards the first outer section 160, and a second portion of the sample flows towards the second outer section 162. The portions of the sample in the first and second outer sections 160, 162 may then be directed out of the sample cell 102 and to the waste line 174 via the first and second outlets 176, 178 and the first and second outlet lines 180, 182, respectively.

The rate of flow of the sample through the first outer section 160 and the second outer section 162 may be modified or adjusted (i.e., increased or decreased) by adjusting the respective lengths of the first outlet line 180 and the second outlet line 182. In at least one implementation, a rate of flow of the first and second portions of the sample through the first and second outer sections 160, 162 may be the same or substantially the same. For example, the rate of flow of the first portion of the sample through the first outer section 160 is the same or substantially the same as the rate of flow of the second portion of the sample through the second outer section 162. In another implementation, the rate of flow of the first and second portions of the sample through the first and second outer sections 160, 162 may be different. It should be appreciated, however, that a time correction may be applied if the rate of flow is different through the first and second outer sections 160, 162.

As the sample flows through the flowpath 144 of the sample cell 102, the laser 108 may emit the beam of light 146 along and through the centerline 156 of the flowpath 144 via the bore 152 of the second mirror 128. In at least one implementation, illustrated in FIG. 1A, the beam of light 146 may be transmitted through the third lens 120, which may at least partially focus the beam of light 146 along the centerline 156 of the flowpath 144. In another implementation, the third lens 120 may be omitted. In at least one implementation, an optional screen or diaphragm 188 may be disposed between the laser 108 and the sample cell 102, and configured to "cleanup," segregate, or otherwise filter stray light (e.g., halo of light) from the beam of light 146. For example, the diaphragm 188 may define a hole or aperture (e.g., adjustable aperture/iris) capable of or configured to filter out stray light from the beam of light 146.

At least a portion of the beam of light 146 may travel or be transmitted from the laser 108 to and through the sample cell 102, the first lens 116, the bore 152 of the second mirror 128, and/or an optional diaphragm 196. For example, at least a portion of the beam of light 146 may be transmitted unhindered or without interacting with any of the analytes in the sample from the laser 108 to and through the sample cell 102, the first lens 116, the bore 152 of the second mirror 128, and/or the optional diaphragm 188. The remaining portion of the beam of light 146 transmitted through the flowpath 144 may interact or otherwise contact analytes suspended, dispersed, or otherwise disposed in the sample and/or flowing through the sample cell 102.

The contact between the beam of light 146 and the analytes in the sample may generate or induce scattered light or analyte scattered beams 190, 192, 194 (see FIGS. 1A and 1B). For example, contact between the beam of light 146 and the analytes contained in the sample or flowing through the flowpath 144 of the sample cell 102 may generate forward and back analyte scattered beams 190, 192. In another example, contact between the beam of light 146 and the analytes contained in the sample or flowing through the flowpath 144 of the sample cell 102 may generate right angle (e.g., about 90° relative to the centerline 156) scattered beams 194 in a direction generally perpendicular to the beam of light 146.

It should be appreciated that the flow of the sample to the center of the flowpath 144 via the inlet 164 allows the sample to interact immediately with the beam of light 146, thereby minimizing peak broadening. For example, flowing the sample directly to the center of the flowpath 144 allows the sample to interact with the beam of light 146 without flowing through at least half the length or volume of the sample cell 102 (e.g., in a lateral or axial direction) and the flowpath 144 thereof. Flowing the sample directly to the center of the flowpath 144 also minimizes the amount of time necessary for the sample to interact with the beam of light 146 and generate the analyte scattered beams 190, 192, 194. It should further be appreciated that one or more components of the LSD 100 are configured such that only light scattered from the center of the flowpath 144 are collected by the detectors 110, 112, 114. For example, at least one of the first lens 116, the first mirror, and the fourth lens 122 may be configured to segregate forward light scattering 190 that originates from the center of the flowpath 144 from forward light scattering 190 that originates from other regions of the flowpath 144, such that the first detector 110 only receives forward light scattering 190 that originates from the center of the flowpath 144. Similarly, at least one of the second lens 116, the second mirror 128, and the fifth lens 124 may be configured to segregate back light scattering 192 that originates from the center of the flowpath 144 from back light scattering 192 that originates from other regions of the flowpath 144, such that the second detector 112 only receives back light scattering 192 that originates from the center of the flowpath 144.

As illustrated in FIG. 1A, the forward analyte scattered beams or forward scattered light 190 may be directed towards the first detector 110 via the first lens 116, the first mirror 126, and the fourth lens 122. At least a portion of the forward scattered light 190 may be at least partially refracted by the convex surface defined along the first end portion 136 of the first lens 116. As illustrated in FIG. 1A, the forward scattered light 190 may be refracted by the convex surface toward the first mirror 126, and the first mirror 126 may reflect the forward scattered light 190 toward the first detector 110 via the fourth lens 122. The fourth lens 122 may collect the forward scattered light 190, and direct and/or focus the forward scattered light 190 toward the first detector 110.

The forward scattered light 190 may be scattered at varying angles of from greater than 0° to less than 90°, relative to the beam of light 146 emitted from the laser 108 and/or the centerline 156 of the flowpath 144. For example, the forward scattered light 190 may be scattered at any angle of from greater than 0°, about 5°, about 10°, about 15°, about 20°, about 25°, about 30°, about 35°, about 40°, or about 45° to about 50°, about 55°, about 60°, about 65°, about 70°, about 75°, about 80°, about 85°, or less than 90°. In another example, the forward scattered light 190 may be scattered at any angle of from about 5°, about 6°, about 7°, about 8°, about 9°, or about 9.5° to about 10.5°, about 11°, about 12°, about 13°, about 14°, or about 15°, relative to the beam of light 146 emitted from the laser 108 and/or the centerline 156 of the flowpath 144. In yet another example, the forward scattered light 190 may be scattered at an angle of from about 5° to about 15°, about 6° to about 14°, about 7° to about 13°, about 8° to about 12°, about 9° to about 11°, or about 9.5° to about 10.5°. It should be appreciated that the LSD 100 and any component thereof may be configured to receive the forward scattered light 190 scattered at any angle greater than 0° and less than 90°. For example, any one or more attributes (e.g., shape, location, orientation, etc.) of the first detector 110, the first lens 116, the first mirror 126, the fourth lens 122, and/or any additional optional diaphragms may be adjusted, modified, or otherwise configured such that the first detector 110 may receive any of the forward scattered light 190. In a preferred implementation, the LSD 100 and the first detector 110 thereof is configured to receive or collect the forward scattered light 190 at an angle of from about 9° to about 11°, preferably about 9.5° to about 10.5°, and more preferably at an angle of about 10°, relative to the beam of light 146 and/or the centerline 156 of the flowpath 144.

As illustrated in FIG. 1A, the back analyte scattered beams or back scattered light 192 may be directed towards the second detector 112 via the second lens 118, the second mirror 128, and the fifth lens 124. At least a portion of the back scattered light 192 may be at least partially refracted by the convex surface of the second lens 118. As illustrated in FIG. 1A, the back scattered light 192 may be refracted by the convex surface toward the second mirror 128, and the second mirror 128 may reflect the back scattered light 192 toward the second detector 112 via the fifth lens 124. The fifth lens 124 may collect the back scattered light 192, and direct and/or focus the back scattered light 192 toward the second detector 112.

The back scattered light 192 may be scattered at varying angles of from greater than 90° to less than 180°, relative to the beam of light 146 emitted from the laser 108 and/or the centerline 156 of the flowpath 144. For example, the back scattered light 192 may be scattered at any angle of from greater than 90°, about 95°, about 100°, about 105°, about 110°, about 115°, about 120°, about 125°, about 130°, or about 135° to about 140°, about 145°, about 150°, about 155°, about 160°, about 165°, about 170°, about 175°, or less than 180°. In another example, the back scattered light 192 may be scattered at any angle of from about 165°, about 166°, about 167°, about 168°, about 169°, or about 169.5° to about 170.5°, about 171°, about 172°, about 173°, about 174°, or about 175°, relative to the beam of light 146 emitted from the laser 108 and/or the centerline 156 of the flowpath 144. In yet another example, the back scattered light 192 may be scattered at an angle of from about 165° to about 175°, about 166° to about 174°, about 167° to about 173°, about 168° to about 172°, about 169° to about 171°, or about 169.5° to about 170.5°. It should be appreciated that the LSD 100 and any component thereof may be configured to receive the back scattered light 192 scattered at any angle greater than 90° and less than 180°. For example, any one or more attributes (e.g., shape, location, orientation, etc.) of the second detector 112, the second lens 118, the second mirror 128, the fifth lens 124, and/or any additional optional diaphragms may be adjusted, modified, or otherwise configured such that the second detector 112 may receive any of the back scattered light 192. In a preferred implementation, the LSD 100 and the second detector 112 thereof is configured to receive or collect the back scattered light 192 at an angle of from about 169° to about 171°, preferably about 169.5° to about 170.5°, and more preferably at an angle of about 170°, relative to the beam of light 146 and/or the centerline 156 of the flowpath 144.

As illustrated in FIG. 1D, the right angle analyte scattered beams or right angle scattered light 194 may be directed towards the third detector 114 via the aperture 184 extending between the third detector 114 and the inner section 158 of the flowpath 144. In at least one implementation, the third detector 114 may be disposed in the aperture 184 adjacent the inner section 158. In another implementation, illustrated in FIG. 1D, the optically transparent material 186 may be disposed in the aperture 184 to seal the inner section 158 of the flowpath 144. The optically transparent material 186 may be any suitable material capable of allowing the right angle scattered light 194 to be transmitted to the third detector 114. The optically transparent material 186 may be shaped to refract at least a portion of the right angle scattered light 194 toward the third detector 114. For example, as previously discussed, the optically transparent material 186 may be a ball lens shaped to refract the right angle scattered light 194 toward the third detector 114.

The right angle scattered light 194 may be scattered in a direction generally perpendicular to the beam of light 146 and/or the centerline 156 of the flowpath 144. For example, the right angle scattered light 194 may be scattered at an angle of from about 87°, about 88°, about 89°, about 89.5°, or about 90° to about 90.5°, about 91°, about 92°, or about 93°. In another example, the right angle scattered light 194 may be scattered at an angle of from about 87° to about 93°, about 88° to about 92°, about 89° to about 91°, or about 89.5° to about 90.5°. It should be appreciated that the LSD 100 and any component thereof may be configured to receive the right angle scattered light 194 scattered in a direction generally perpendicular to the beam of light 146 and/or the centerline 156 of the flowpath 144. For example, the shape, location, orientation, or any other attributes of the optically transparent material 186 (e.g., the sixth lens) and/or the third detector 114 may be adjusted, modified, or otherwise configured such that the third detector 114 may receive any of the right angle scattered light 194. In a preferred implementation, the LSD 100 and the third detector 114 thereof is configured to receive or collect the right angle scattered light 194 at an angle of from about 89° to about 91°, preferably about 89.5° to about 90.5°, and more preferably at an angle of about 90°, relative to the beam of light 146 and/or the centerline 156 of the flowpath 144.

The present disclosure may provide methods for determining a radius of gyration (Rg) of a particle (e.g., nanoparticle, microparticle, etc.) in solution using a light scattering detector, such as the LSD 100 disclosed herein. The particle may be, for example, a polymer, a protein, a protein conjugate, or a DNA fragment. For example, the present disclosure may provide methods for determining the radius of gyration (Rg) of a particle in solution by analyzing data (e.g., via an electronic processor or computer system) from the light scattering detector (e.g., the LSD 100). While reference may be made to the LSD 100 and the components thereof described herein, it should be appreciated that the methods for determining the radius of gyration (Rg) may be conducted or performed with any suitable light scattering detector.

The method for determining a radius of gyration (Rg) of a particle in solution using a light scattering detector (e.g., the LSD 100) may include passing or flowing the particle in solution through a flowpath 144 in a sample cell 102 of the LSD 100, where the centerline 156 of the flowpath 144 is aligned with the beam of light 146 of the LSD 100. The method may also include normalizing one or more angles of the light scattering detector (e.g., the LSD 100) or determining an angular normalization factor ($N_\theta$) for the one or more angles of the light scattering detector. For example, the method may include determining an angular normalization factor ($N_\theta$) for a first angle. In another example, the method may include determining an angular normalization factor ($N_\theta$) for a first angle and a second angle. As further discussed herein, the first angle may be either about 90° or about 170° relative to the centerline 156 of the flowpath 144, and the second angle may be either about 90° or about 170° and different from the first angle. The method may also include obtaining a first scattering intensity ($I_{\theta 1}$) of the particle in solution at the first angle. The method may also include optionally obtaining a second light scattering intensity ($I_{\theta 2}$) of the particle in solution at the second angle. The method may further include obtaining a 10° scattering intensity ($I_{10}$) of the particle in solution at an angle of about 10° or less. The method may also include determining a first particle scattering factor ($P_{\theta 1}$) with the first scattering intensity ($I_{\theta 1}$), the 10° scattering intensity ($I_{10}$), and the angular normalization factor ($N_{\theta 1}$) for the first angle. The method may also include optionally determining a second particle scattering factor ($P_{\theta 2}$) with the second scattering intensity ($I_{\theta 2}$), the 10° scattering intensity ($I_{10}$), and the angular normalization factor ($N_{\theta 2}$) for the second angle. The method may also include plotting an angular dissymmetry plot, fitting a line to the angular dissymmetry plot, and determining a slope of the line of the angular dissymmetry plot at a selected location. The method may also include determining the radius of gyration (Rg) of the particle in solution from the slope of the line, and optionally, outputting or displaying the radius of gyration.

As discussed above, the method for determining the radius of gyration (Rg) of the particle in solution may include normalizing the one or more angles of the light scattering detector or determining an angular normalization factor ($N_\theta$) for the one or more angles of the LSD 100. Determining an angular normalization factor ($N_\theta$) for one or more angles of the LSD 100 may be performed to account for scattering volume differences of the LSD 100 or varying sensitivities of any one or more of the detectors 110, 112, 114.

In at least one implementation, only one angle of the LSD 100 is normalized. For example, one or a first angle of the LSD 100 that may be normalized may include either an angle of about 90° or about 170°. In another implementation, two or first and second angles of the LSD 100 are normalized. For example, a first angle at about 90° and a second angle at about 170° are normalized. The number of angles normalized may be at least partially determined by a size or radius of gyration of the particle. For example, only one or the first angle of the LSD 100 may be normalized for determining the Rg of a particle having an Rg of less than or equal to about 10 nm. In another example, two or first and second angles of the LSD 100 may be normalized for determining the Rg of a particle having an Rg of about 10 nm or greater to about 100 nm. It should be appreciated that the first and second angles of the LSD 100 may also be normalized for determining the Rg of a particle having an Rg of less than 10 nm.

Normalizing an angle (e.g., 90°, 170°, etc.) of the LSD 100 or determining an angular normalization factor ($N_\theta$) for the angle may include passing a plurality of known particle standards (e.g., known polymer standards) in solution through the flowpath 144 of the sample cell 102, passing the beam of light 146 through the centerline 156 of the flowpath 144, collecting the analyte scattered light 192, 194 at the angle, and determining a scattering intensity ($I_\theta$) at the angle with the analyte scattered light 192, 194 collected at the angle. For example, determining the angular normalization factor ($N_\theta$) for an angle of about 90° or about 170° may include passing a plurality of known particle standards in solution through the flowpath 144 of the sample cell 102, passing the beam of light 146 through the centerline 156 of the flowpath 144, collecting the analyte scattered light 192, 194 at the angle of about 90° or about 170°, respectively, and determining a scattering intensity ($I_\theta$) at the angle of about 90° ($I_\theta$) or about 170° ($I_{170}$) with the analyte scattered light 192, 194 collected at the angle of about 90° or about 170°, respectively.

Determining the angular normalization factor ($N_\theta$) for the angle (e.g., 90°, 170°, etc.) may also include collecting the analyte scattered light 190 at an angle (e.g., 0°) close to or incident with the beam of light 146 and determining a scattering intensity ($I_0$) at the angle close to or incident with the beam of light. It should be appreciated that collecting the analyte scattered light 190 at an angle of about 0° relative to the centerline 156 is not possible, as the signal from the beam of light 146 is relatively greater than any analyte scattered light at the angle of about 0°; and thus, would mask any analyte scattered light at the angle of about 0°. As such, the analyte scattered light 190 is collected at an angle close to the beam of light 146. For example, it is assumed that analyte scattered light 190 collected at an angle of about 10° or less is equivalent to the analyte scattered light collected at about 0°. As such, the scattering intensity at an angle of about 10° ($I_{10}$) is equivalent or substantially equivalent to the scattering intensity at about 0° ($I_0$).

Figure 2:
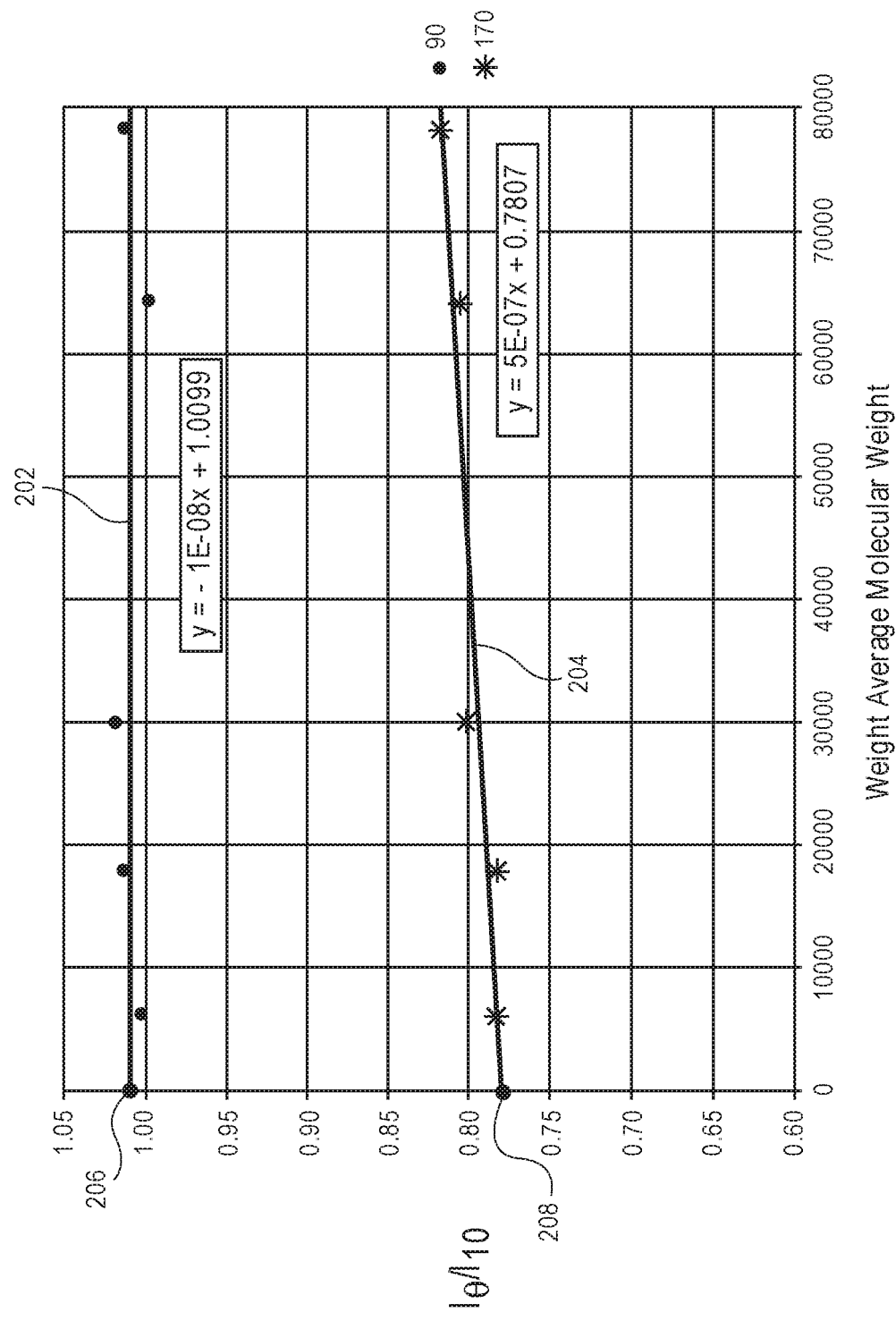
FIG. 2 illustrates a plot of a ratio ($I_\theta/I_{10}$) versus a respective weight average molecular weight of each of a plurality of known particles, according to one or more implementations disclosed.

Determining the angular normalization factor ($N_\theta$) for the angle (e.g., 90°, 170°, etc.) may also include plotting a ratio of the scattering intensity values of each of the plurality of known particles at the angle (e.g., 90°, 170°, etc.) to the scattering intensity values of each of the plurality of known particles at an angle of about 10° ($I_{10}$), namely a ratio of ($I_\theta/I_{10}$), versus a respective weight average molecular weight of each of the plurality of known particles. An illustrative plot of the ratio ($I_\theta/I_{10}$) versus the respective weight average molecular weight of each of the plurality of known particles is shown in FIG. 2. For example, determining the angular normalization factor ($N_{90}$) for an angle of about 90° may include plotting the ratio ($I_{19}/I_{10}$) of the scattering intensity ($N_{90}$) values of each of the plurality of known particles at an angle of about 90° to the scattering intensity values ($I_{10}$) of each of the plurality of known particles at an angle of about 10° versus the respective weight average molecular weight of each of the plurality of known particles. In another example, determining the angular normalization factor ($N_{170}$) for an angle of about 170° may include plotting the ratio ($I_{170}/I_{10}$) of the scattering intensity ($I_{170}$) values of each of the plurality of known particles at an angle of about 170° to the scattering intensity ($I_{10}$) values of each of the plurality of known particles at an angle of about 10° versus the respective weight average molecular weight of each of the plurality of known particles.

Determining the angular normalization factor ($N_\theta$) for the angle (e.g., 90°, 170°, etc.) may also include fitting a line to the plot of the ratio ($I_\theta/I_{10}$) versus the respective weight average molecular weight of each of the plurality of known particles. For example, as illustrated in FIG. 2, determining the angular normalization factor ($N_{90}$) for the angle at about 90° may include fitting a line 202 to the plot of the ratio ($I_{90}/I_{10}$) versus the respective weight average molecular weight of each of the plurality of known particles. In another example, illustrated in FIG. 2, determining the angular normalization factor ($N_{170}$) for the angle at about 170° may include fitting a line 204 to the plot of the ratio ($I_{170}/I_{10}$) versus the respective weight average molecular weight of each of the plurality of known particles.

Determining the angular normalization factor ($N_\theta$) for the angle (e.g., 90°, 170°, etc.) may further include extrapolating the respective lines 202, 204 of each of the plots to determine the angular normalization factor ($N_\theta$). It should be appreciated that the angular normalization factor ($N_\theta$) for the angle may be the extrapolated value at a molecular weight or x-value of 0. For example, the angular normalization factor ($N_\theta$) for the respective angle may be the value at a respective y-intercept 206, 208 of each of the lines 202, 204. For example, as illustrated in FIG. 2, the angular normalization factor ($N_{90}$), as determined by the y-intercept 206, for the angle at about 90° is about 1.0099. As further illustrated in FIG. 2, the angular normalization factor ($N_{170}$), as determined by the y-intercept 208, for the angle at about 170° is about 0.7807.

As discussed above, the method for determining the radius of gyration (Rg) of the particle in solution may include obtaining a first light scattering intensity ($I_{\theta 1}$) of the particle in solution (e.g., the unknown particle in solution) at the first angle (e.g., 90°, 170°, etc.), and optionally obtaining a second light scattering intensity ($I_{\theta 2}$) of the particle in solution at the second angle. For example, the method may include passing the particle in solution through the flowpath 144 in the sample cell 102, collecting the analyte scattered light 192, 194 at the first angle and/or the second angle, and determining the scattering intensity of the first angle ($I_{\theta 1}$) and/or the second angle ($I_{\theta 2}$).

The method may also include obtaining a scattering intensity ($I_\theta$) of the particle in solution at an angle close to or incident with the beam of light 146 by collecting the analyte scattered light 190 at an angle of about 0° relative to the centerline 156. As discussed above, collecting the analyte scattered light 190 at an angle of about 0° relative to the centerline 156 is not possible, as the signal from the beam of light 146 is relatively greater than any analyte scattered light at the angle of about 0°; and thus, would mask any analyte scattered light at the angle of about 0°. As such, the analyte scattered light 190 of the particle in solution is collected at an angle close to the beam of light 146. For example, it is assumed that analyte scattered light 190 collected at an angle of about 10° or less is equivalent to the analyte scattered light collected at about 0°. As such, the scattering intensity ($I_{10}$) of the particle in solution at an angle of about 10° is equivalent to the scattering intensity ($I_\theta$) of the particle in solution at about 0°.

As discussed above, the method for determining the radius of gyration (Rg) of the particle in solution may include determining a first particle scattering factor ($P_{\theta 1}$) with or utilizing the first scattering intensity ($I_{\theta 1}$), the 10° scattering intensity ($I_{10}$), and the angular normalization factor ($N_{\theta 1}$) for the first angle. The method for determining the radius of gyration (Rg) of the particle in solution may also, optionally, include determining a second particle scattering factor ($P_{\theta 2}$) with or utilizing the second scattering intensity ($I_{\theta 2}$), the 10° scattering intensity ($I_{10}$), and the angular normalization factor ($N_{\theta 2}$) for the second angle.

In at least one implementation, the particle scattering factor ($P_\theta$) may be represented by equation (1):

$$P_\theta = \frac{\left(\frac{I_\theta}{I_{10}}\right)}{N_\theta},\tag{1}$$

where:
- $I_\theta$ may be the scattering intensity of the particle in solution at a respective angle (e.g., about 90° or about 170°);
- $I_{10}$ is the scattering intensity of the particle in solution at an angle of about 10° or less; and
- $N_\theta$ is the angular normalization factor for the respective angle.

It should be appreciated that the particle scattering factor ($P_0$) at 0° may be assumed to be the same particle scattering factor ($P_{10}$) at about 10°, which is equal to one (1).

Figure 3:
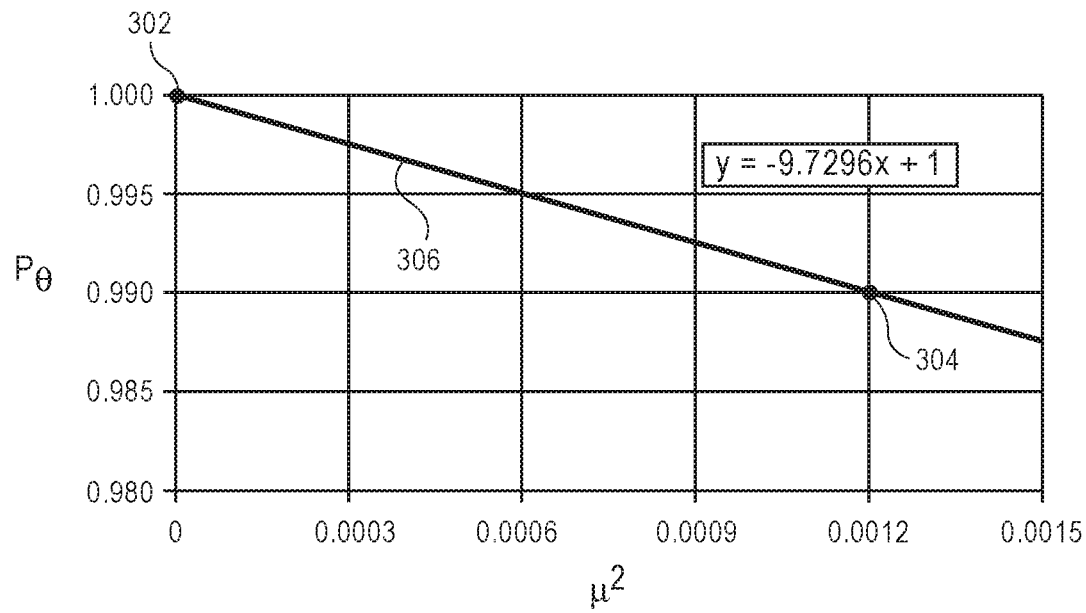
FIG. 3 illustrates an angular dissymmetry plot, according to one or more implementations disclosed.
Figure 4:
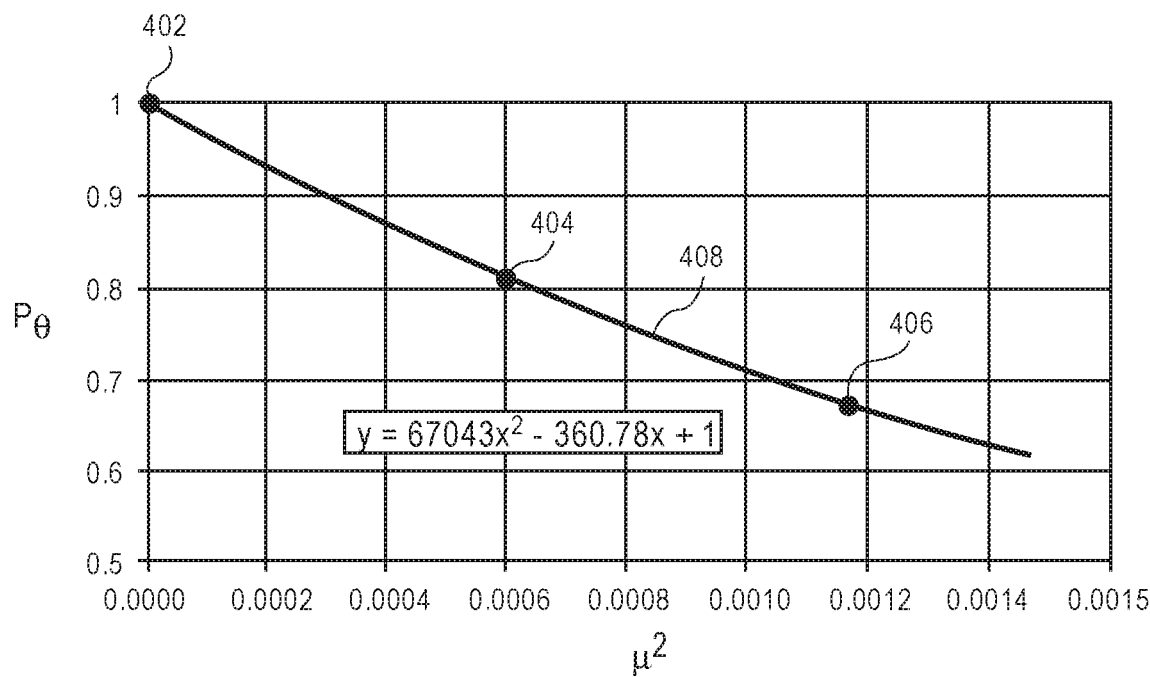
FIG. 4 illustrates an angular dissymmetry plot, according to one or more implementations disclosed.

As discussed above, the method for determining the radius of gyration (Rg) of the particle in solution may further include plotting an angular dissymmetry plot. Illustrative angular dissymmetry plots are shown in FIGS. 3 and 4. The angular dissymmetry plot may include one or more points on a plane. For example, the angular dissymmetry plot may include one, two, three, four, or more points on a plane. As illustrated in FIG. 3, the angular dissymmetry plot may include a first point 302 and a second point 304. As further illustrated in FIG. 4, the angular dissymmetry plot may include a first point 402, a second point 404, and a third point 406. Each of the points 302, 304, 402, 404, 406 may include a first coordinate, such as an x-coordinate, and a second coordinate, such as a y-coordinate. The first or x-coordinate may be represented by $\mu^2$, which may be expressed by equation (2):

$$\mu_\theta^2 = \left(\frac{4\pi n_0 \sin\frac{\theta}{2}}{\lambda}\right)^2,\tag{2}$$

where:
- $n_\theta$ is a refractive index of the solution in which the particle is contained;
- $\theta$ is the respective angle (e.g., about 90° or about 170°); and
- $\lambda$ is a wavelength of the beam of light.

The second or y-coordinate may be represented by the respective particle scattering factor ($P_\theta$). It should be appreciated that the beam of light may have any suitable wavelength. In at least one implementation, the wavelength may be from about 400 nm to about 600 nm. For example, the wavelength of the beam of light may be from about 400 nm, about 450 nm, or about 500 nm to about 550 nm, or about 600 nm. In a preferred implementation, the wavelength of the beam of light may be from about 450 nm to about 550 nm, about 500 nm to about 530 nm, or about 515 nm. In one implementation, the wavelength of the beam of light may exclude wavelengths of about 600 nm or greater to about 700 nm.

As illustrated in FIG. 3, the angular dissymmetry plot may include the first point 302 corresponding to the angle at 0°, or about 10° based on the assumption discussed above, and the second point 304 corresponding to either an angle of about 90° or an angle of about 170°. A first or x-coordinate of the first point 302 is equal to $\mu^2$, which according to equation 2 is equal to zero (0). A second coordinate of the first point 302 is equal to the particle scattering factor ($P_{10}$), which is equal to one (1). Similarly, a first or x-coordinate of the second point 304 is equal to $\mu^2$ calculated at either about 90° or about 170°, and a second or y-coordinate of the second point 304 is equal to the respective particle scattering factor ($P_\theta$). As illustrated in FIG. 4, the angular dissymmetry plot may include the first point 402 corresponding to the angle at 0°, or about 10° based on the assumptions discussed above, the second point 404 corresponding to the angle at about 90°, and the third point 406 corresponding to the angle at about 170°. The respective first and second coordinates of each of the first, second, and third points 402, 404, 406 of the angular dissymmetry plot of FIG. 4 may be determined as discussed above.

As discussed above, the method for determining the radius of gyration (Rg) of the particle in solution may also include fitting a line 306, 408 to the angular dissymmetry plot. Fitting the line 306, 408 to the angular dissymmetry plot may include a least squares fitting. The line 306, 408 may include a polynomial degree of less than three. The line 306, 408 may be a straight line or a curved line. For example, as illustrated in FIG. 3, the line 306 may be a straight line and have a polynomial degree of one. In another example, illustrated in FIG. 4, the line 408 may be curved line that may have a quadratic relationship and a polynomial degree of two.

As discussed above, the method for determining the radius of gyration (Rg) of the particle in solution may include determining a slope of the line 306, 408 at a selected location on the line 306, 408. The selected location on the line 306, 408 may be anywhere along the line. In at least one implementation, the selected location on the line 306, 408 may be at a y-intercept or where the x-value is zero.

The method for determining the radius of gyration (Rg) of the particle in solution may also include calculating or determining the radius of gyration (Rg) of the particle in solution with or from the slope of the line 306, 408 at the selected location. The radius of gyration (Rg) of the particle in solution may be represented by equation (3):

$$Rg^2 = -3 \times b \tag{3},$$

where b is slope of the line at the selected location.

The method for determining the radius of gyration (Rg) of the particle in solution may also include outputting or displaying the radius of gyration (Rg). For example, the method may include outputting the radius of gyration (Rg) on a display (e.g., computer display), a readout, a report, or a disk storage of a computing system, such as the computing system described herein.

Figure 5:
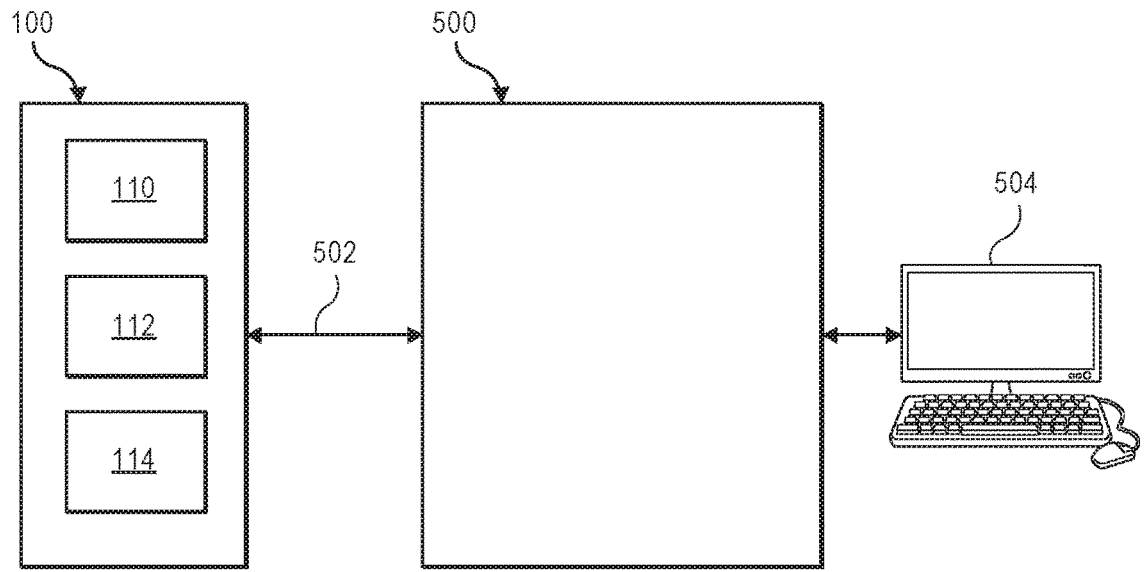
FIG. 5 illustrates a computer system or electronic processor for receiving and/or analyzing data from a light scattering detector, according to one or more implementations disclosed.

FIG. 5 illustrates a computer system or electronic processor 500 for receiving and/or analyzing data from the LSD 100, according to one or more implementations. The computer system or electronic processor 500 may be a general purpose computer, and may allow a user or chromatographer to process data, analyze data, interpret data, store data, retrieve data, display data, display results, interpret results, store results, or any combination thereof. The results may be graphical in form and/or tabular in form. It should be appreciated that, while the electronic processor 500 is shown operably and/or communicably coupled with the LSD 100 of FIG. 1A, the electronic processor 500 may be operably and/or communicably coupled with any suitable light scattering detector known in the art.

The computer system or electronic processor 500 may be capable of or configured to operate, communicate with (e.g., send/receive data), modify, modulate, or otherwise run any one or more components of the LSD 100. For example, the electronic processor 500 may be operably and/or communicably coupled with and capable of or configured to operate, communicate with, modify, modulate, or otherwise run a pump (not shown), the laser 108, the sample source 104, any one or more of the detectors 110, 112, 114, or any other component of the LSD 100.

In at least one implementation, illustrated in FIG. 5, the electronic processor 500 may be operably and/or communicably coupled with the detectors 110, 112, 114 and capable of or configured to send and/or received signals and/or data 502 therefrom. The data 502 from the one or more detectors 110, 112, 114 may be or include analog data, such as fluctuating analog voltage. In at least one implementation, the electronic processor 500 may be capable of or configured to convert the analog data to digital data. For example, the electronic processor 500 may include an analog to digital converter (not shown). In another implementation, an analog to digital converter may be interposed between the LSD 100 or the detectors 110, 112, 114 thereof and the electronic processor 500.

The electronic processor 500 may be capable of or configured to receive, collect, record, and/or store data 502 from any one or more components of the LSD 100. For example, as illustrated in FIG. 5, the electronic processor 500 may receive data 502 from the one or more detectors 110, 112, 114 of the LSD 100, optionally convert the data 502, and record and/or store the data 502 in a computer memory, such as a local drive or network drive (e.g., cloud drive).

The electronic processor 500 may be capable of or configured to analyze, process, display, and/or output data 502. For example, the electronic processor 500 may include software capable of or configured to analyze, process, display, and/or output data 502. The software may also be capable of or configured to process the data 502 and output or display the data 502 on a workstation or display 504. The software may include any one or more of the algorithms, equations, methods, steps, processes, or formulas disclosed herein. The electronic processor 500 may process and/or extract information from the data 502 to prepare results, and present the data 502 and/or the results, such as in a report or on the display 504. The electronic processor 500 may include a graphical user interface (GUI) that allows a user or the chromatographer to interact with all systems, subsystems, and/or components of the electronic processor 500 and/or the LSD 100.

Figure 6:
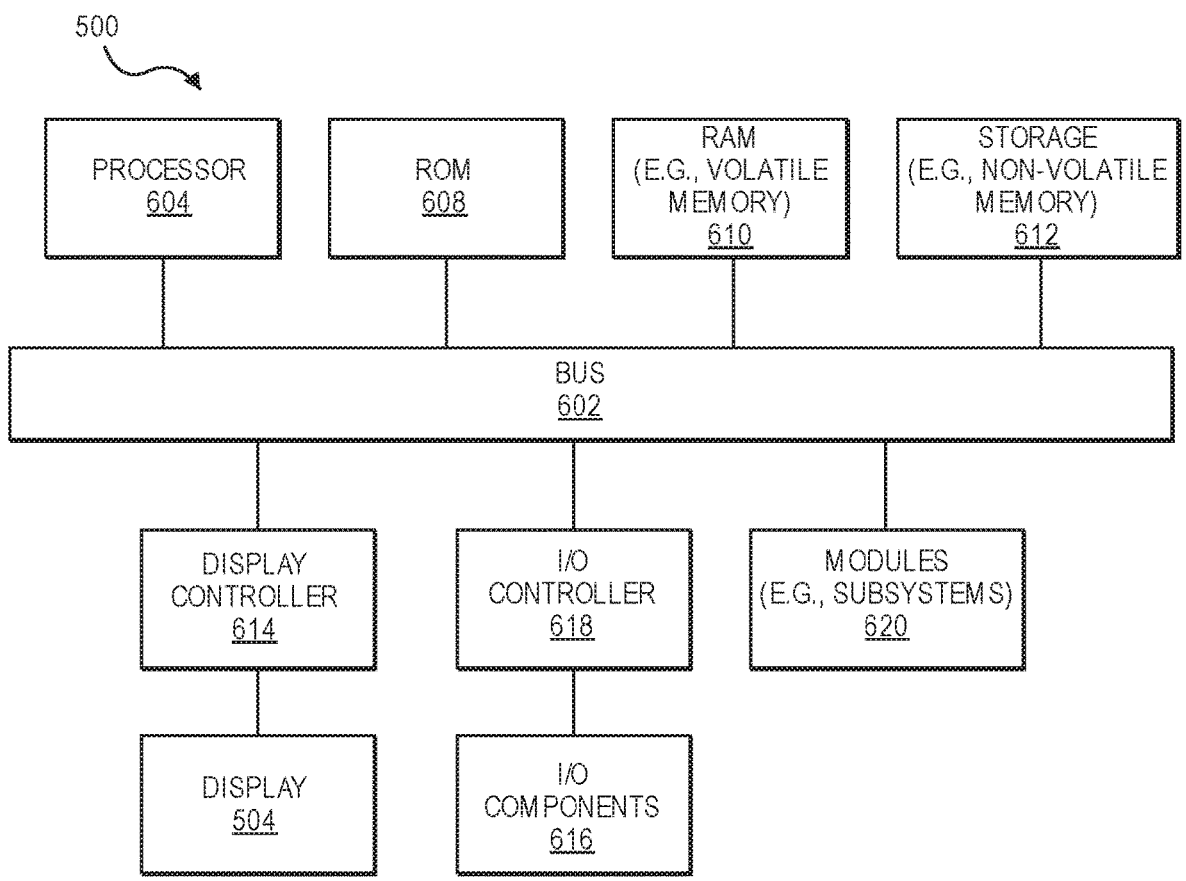
FIG. 6 illustrates a block diagram of the computer system or electronic processor of FIG. 5, according to one or more implementations disclosed.

FIG. 6 illustrates a block diagram of the computer system or electronic processor 500 of FIG. 5 that may be used in conjunction with one or more light scattering detectors, including the LSD 100, and/or one or more methods disclosed herein. For example, the computing system 500 (or system, or server, or computing device, or device) may represent any of the devices or systems described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 602 which may be coupled to a processor 604, ROM (Read Only Memory) 608, RAM (or volatile memory) 610, and storage (or non-volatile memory) 612. The processor 604 may store data 502 (see FIG. 5) in one or more of the memories 608, 610, 612. The processor 604 may also retrieve stored data from one or more of the memories 608, 610, and 612. The one or more memories 608, 610, 612 may store the software disclosed therein, which may include instructions to perform any one or more of the processes, operations, or methods described herein. The processor 604 may also retrieve stored software or the instructions thereof from one or more of the memories 608, 610, and 612 and execute the instructions to perform any one or more of the processes, operations, or methods described herein. These memories represent examples of a non-transitory computer-readable medium (or machine-readable medium) or storage containing instructions which when executed by a processor 604 (or system, or computing system), cause the processor 604 to perform any one or more of the processes, operations, or methods described herein. The RAM 610 may be implemented as, for example, dynamic RAM (DRAM), or other types of memory that require power continually in order to refresh or maintain the data in the memory. Storage 612 may include, for example, magnetic, semiconductor, tape, optical, removable, non-removable, and/or other types of storage that maintain data even after power is removed from the computer system 500. It should be appreciated that storage 612 may be remote from the system 500 (e.g. accessible via a network).

A display controller 614 may be coupled to the bus 602 in order to receive data to be displayed on a display 504, which may display any one of the user interface features or implementations described herein and may be a local or a remote display device 504. The computing system 500 may also include one or more input/output (I/O) components 616 including mice, keyboards, touch screen, network interfaces, printers, speakers, and other devices. Typically, the input/output components 616 are coupled to the system 500 through an input/output controller 618.

Modules 620 (or program code, instructions, components, subsystems, units, functions, or logic) may represent any of the instructions, subsystems, steps, methods, equations, calculations, plots, or engines described above. Modules 620 may reside, completely or at least partially, within the memories described above (e.g. non-transitory computer-readable media), or within a processor 604 during execution thereof by the computing system 500. In addition, Modules 620 may be implemented as software, firmware, or functional circuitry within the computing system 500, or as combinations thereof.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A method for determining a radius of gyration (Rg) of a particle in a solution using a light scattering detector, the method comprising:

passing the particle in the solution through a flowpath in a sample cell, wherein the flowpath has a centerline aligned with a beam of light directed through a portion of the detector;

determining an angular normalization factor ($N_{\theta 1}$) for a first angle of the detector, wherein the first angle is either about 90° or about 170° relative to the centerline;

obtaining a first scattering intensity ($I_{\theta 1}$) of the particle in the solution at the first angle;

obtaining a second scattering intensity ($I_{\theta 2}$) of the particle in the solution at a second angle, wherein the second angle is greater than 0° to less than 90°;

determining a first particle scattering factor ($P_{\theta 1}$) with the first scattering intensity ($I_{\theta 1}$), the second scattering intensity ($I_{\theta 2}$), and the angular normalization factor ($N_{\theta 1}$) for the first angle;

plotting an angular dissymmetry plot, wherein the angular dissymmetry plot comprises the first particle scattering factor ($P_{\theta 1}$);

fitting a line to the angular dissymmetry plot;

determining a slope of the line at a selected location on the line;

determining the radius of gyration (Rg) of the particle in the solution from the slope of the line; and outputting the radius of gyration.

2. The method of claim 1, wherein determining the angular normalization factor ($N_{\theta 1}$) for the first angle of the detector comprises:

passing each of a plurality of known particles in the solution through the flowpath of the sample cell;

obtaining scattering intensity values of each of the plurality of known particles in the solution at the first angle and the second angle; and determining the angular normalization factor ($N_{\theta 1}$) for the first angle with a plot of a ratio of the scattering intensity values of each of the plurality of known particles at the first angle to the scattering intensity values of each of the plurality of known particles at the second angle with respect to a respective weight average molecular weight of each of the plurality of known particles in the solution.

3. The method of claim 2, wherein each of the plurality of known particles in the solution have a known molecular weight.

4. The method of claim 1, wherein the first particle scattering factor ($P_{\theta 1}$) is in the form $$P_{\theta 1} = \frac{\left(\frac{I_{\theta 1}}{I_{\theta 2}}\right)}{N_{\theta 1}},$$

wherein:

$I_{\theta 1}$ is the scattering intensity of the particle in the solution at the first angle;

$I_{\theta 2}$ is the scattering intensity of the particle in the solution at the second angle; and $N_{\theta 1}$ is the angular normalization factor for the first angle.

5. The method of claim 1, wherein plotting the angular dissymmetry plot comprises:

plotting a first point on a plane, the first point comprising a first coordinate and a second coordinate, wherein the first coordinate of the first point is the first particle scattering factor (Poi), and wherein the second coordinate of the first point is in the form $$\mu_{\theta 1}^2 = \left(\frac{4\pi n_0 \sin\frac{\theta_1}{2}}{\lambda}\right)^2,$$

wherein:

$n_0$ is a refractive index of the solution;

$\theta_1$ is the first angle; and $\lambda$ is a wavelength of the beam of light.

6. The method of claim 1, wherein the line of the angular dissymmetry plot is a straight line.

7. The method of claim 1, wherein the radius of gyration (Rg) of the particle in the solution is less than 10 nm.

8. The method of claim 1, further comprising:

obtaining an angular normalization factor ($N_{\theta 2}$) of a third angle of the detector;

obtaining a third scattering intensity ($I_{\theta 3}$) of the particle in the solution at the third angle; and determining a second particle scattering factor ($P_{\theta 2}$) with the third scattering intensity ($I_{\theta 3}$), the second scattering intensity ($I_{\theta 2}$), and the angular normalization factor ($N_{\theta 2}$) for the third angle, wherein the angular dissymmetry plot further comprises the second particle scattering factor ($P_{\theta 2}$).

9. The method of claim 8, wherein the third angle is either about 90° or about 170° relative to the centerline, and wherein the third angle is different from the first angle.

10. The method of claim 9, wherein determining the angular normalization factor ($N_{\theta 2}$) of the third angle of the detector comprises:

obtaining scattering intensity values of each of the plurality of known particles in the solution at the third angle; and determining the angular normalization factor ($N_{\theta 2}$) for the third angle with a plot of a ratio of the scattering intensity values of each of the plurality of known particles at the third angle to the scattering intensity values of each of the plurality of known particles at the second angle with respect to a respective weight average molecular weight of each of the plurality of known particles in the solution.

11. The method of claim 10, wherein the second particle scattering factor ($P_{\theta 2}$) is in the form $$P_{\theta 2} = \frac{\left(\frac{I_{\theta 3}}{I_{\theta 2}}\right)}{N_{\theta 2}},$$

wherein:

$I_{\theta 3}$ is the scattering intensity of the particle in the solution at the third angle;

$I_{\theta 2}$ is the scattering intensity of the particle in the solution at the second angle; and $N_{\theta 2}$ is the angular normalization factor for the third angle.

12. The method of claim 8, wherein plotting the angular dissymmetry plot further comprises:

plotting a second point on the plane, the second point comprising a first coordinate and a second coordinate, wherein the first coordinate of the second point is the second particle scattering factor ($P_{\theta 2}$), and wherein the second coordinate of the second point is in the form $$\mu_{\theta 2}^2 = \left(\frac{4\pi n_0 \sin\frac{\theta_3}{2}}{\lambda}\right)^2,$$

wherein:

$n_0$ is a refractive index of the solution;

$\theta_3$ is the third angle; and $\lambda$ is the wavelength of the beam of light.

13. The method of claim 1, wherein the line of the angular dissymmetry plot is a curved line.

14. The method of claim 1, wherein the radius of gyration (Rg) of the particle in the solution is less than 100 nm.

15. A method for determining a radius of gyration (Rg) of a particle in a solution using a light scattering detector, the method comprising:
- passing the particle in the solution through a flowpath in a sample cell, wherein the flowpath has a centerline aligned with a beam of light directed through a portion of the detector;
- determining an angular normalization factor ($N_{\theta 1}$) for a first angle of the detector relative to the centerline;
- determining an angular normalization factor ($N_{\theta 2}$) of a second angle of the detector relative to the centerline;
- obtaining a first scattering intensity ($I_{\theta 1}$) of the particle in the solution at the first angle;
- obtaining a second scattering intensity ($I_{\theta 2}$) of the particle in the solution at the second angle;
- obtaining a third scattering intensity ($I_{\theta 3}$) of the particle in the solution at a third angle of the detector relative to the centerline;
- determining a first particle scattering factor ($P_{\theta 1}$) with the first scattering intensity ($I_{\theta 1}$), the third scattering intensity ($I_{\theta 3}$), and the angular normalization factor ($N_{\theta 1}$) for the first angle;
- determining a second particle scattering factor ($P_{\theta 2}$) with the second scattering intensity ($I_{\theta 2}$), the third scattering intensity ($I_{\theta 3}$), and the angular normalization factor ($N_{\theta 2}$) for the second angle;
- plotting an angular dissymmetry plot, wherein the angular dissymmetry plot comprises the first particle scattering factor ($P_{\theta 1}$) and the second particle scattering factor ($P_{\theta 2}$);
- fitting a line to the angular dissymmetry plot;
- determining a slope of the line at a selected location on the line;
- determining the radius of gyration (Rg) of the particle in solution from the slope of the line; and
- outputting the radius of gyration (Rg).

16. The method of claim 15, wherein determining the angular normalization factor ($N_{\theta 1}$) for the first angle and the angular normalization factor ($N_{\theta 2}$) of the second angle comprises:
- passing each of a plurality of known particles in the solution through the flowpath of the sample cell;
- obtaining scattering intensity values for each of the plurality of known particles in the solution at the first angle, at the second angle, and at the third angle;
- determining the angular normalization factor ($N_{\theta 1}$) for the first angle with a plot of a ratio of the scattering intensity values of each of the plurality of known particles at the first angle to the scattering intensity values of each of the plurality of known particles at the third angle;
- determining the angular normalization factor ($N_{\theta 2}$) for the second angle with a plot of a ratio of the scattering intensity values of each of the plurality of known particles at the second angle to the scattering intensity values of each of the plurality of known particles at the third angle.

17. The method of claim 16, wherein each of the plurality of known particles in the solution have a known molecular weight.

18. The method of claim 15, wherein the first particle scattering factor ($P_{\theta 1}$) is in the form $$P_{\theta 1} = \frac{\left(\frac{I_{\theta 1}}{I_{\theta 3}}\right)}{N_{\theta 1}},$$

where:
- $I_{\theta 2}$ is the scattering intensity of the particle in the solution at the first angle;
- $I_{\theta 3}$ is the scattering intensity of the particle in the solution at the third angle; and
- $N_{\theta 2}$ is the angular normalization factor for the first angle.

19. The method of claim 15, wherein the second particle scattering factor ($P_{\theta 2}$) is in the form $$P_{\theta 2} = \frac{\left(\frac{I_{\theta 2}}{I_{\theta 3}}\right)}{N_{\theta 2}},$$

wherein:
- $I_{\theta 2}$ is the scattering intensity of the particle in the solution at the second angle;
- $I_{\theta 3}$ is the scattering intensity of the particle in the solution at the third angle; and
- $N_{\theta 2}$ is the angular normalization factor for the second angle.

20. The method of claim 15, wherein plotting the angular dissymmetry plot comprises:
- plotting a first point on a plane, the first point comprising a first coordinate and a second coordinate, wherein the first coordinate of the first point is the first particle scattering factor ($P_{\theta 1}$), and wherein the second coordinate of the first point is in the form $$\mu_{\theta 1}^2 = \left(\frac{4\pi n_0 \sin\frac{\theta_1}{2}}{\lambda}\right)^2,$$

wherein:
- $n_0$ is a refractive index of the solution;
- $\theta_1$ is the first angle; and
- $\lambda$ is a wavelength of the beam of light; and plotting a second point on the plane, the second point comprising a first coordinate and a second coordinate, wherein the first coordinate of the second point is the second particle scattering factor ($P_{\theta 2}$), and wherein the second coordinate of the second point is in the form $$\mu_{\theta 2}^2 = \left(\frac{4\pi n_0 \sin\frac{\theta_2}{2}}{\lambda}\right)^2,$$

wherein:
- $n_0$ is a refractive index of the solution;
- $\theta_2$ is the second angle; and
- $\lambda$ is the wavelength of the beam of light.

* * * * *

UNITED STATES PATENT AND TRADEMARK OFFICE
CERTIFICATE OF CORRECTION

PATENT NO. : 11,674,880 B2
APPLICATION NO. : 17/470280
DATED : June 13, 2023
INVENTOR(S) : Max Haney et al.

It is certified that error appears in the above-identified patent and that said Letters Patent is hereby corrected as shown below:

In the Claims

In Claim 1, Column 23, Line 6, "$P_{O1}$" should read -- $P_{\theta 1}$ --

In Claim 5, Column 23, Line 58, "Poi" should read -- $P_{\theta 1}$ --

Signed and Sealed this
Twelfth Day of September, 2023

Katherine Kelly Vidal
*Director of the United States Patent and Trademark Office*